(12) United States Patent
Guma et al.

(10) Patent No.: US 12,539,099 B2
(45) Date of Patent: Feb. 3, 2026

(54) NON-RESONANT ACOUSTIC METAMATERIAL FOR RENDERING OBJECTS TRANSPARENT TO ULTRASOUND

(71) Applicant: The Regents of the University of California, Oakland, CA (US)

(72) Inventors: Monica Guma, San Diego, CA (US); James Friend, San Diego, CA (US); Oscar Vazquez Mena, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 895 days.

(21) Appl. No.: 17/281,869

(22) PCT Filed: Oct. 18, 2019

(86) PCT No.: PCT/US2019/057047
§ 371 (c)(1),
(2) Date: Mar. 31, 2021

(87) PCT Pub. No.: WO2020/082009
PCT Pub. Date: Apr. 23, 2020

(65) Prior Publication Data
US 2021/0393238 A1    Dec. 23, 2021

Related U.S. Application Data

(60) Provisional application No. 62/747,641, filed on Oct. 18, 2018.

(51) Int. Cl.
*A61B 8/00* (2006.01)
*B06B 3/00* (2006.01)
(Continued)

(52) U.S. Cl.
CPC .............. *A61B 8/4272* (2013.01); *B06B 3/00* (2013.01); *G01S 15/8906* (2013.01);
(Continued)

(58) Field of Classification Search
CPC ....... A61B 8/4272; A61B 8/0875; B06B 3/00; G01S 15/8906; G10K 11/168
(Continued)

(56) References Cited

U.S. PATENT DOCUMENTS 9,390,702 B2   7/2016   Mathur
9,761,324 B2   9/2017   Lal et al.
(Continued)

FOREIGN PATENT DOCUMENTS

WO    WO-2009/116956 A1    9/2009

OTHER PUBLICATIONS

International Search Report and Written Opinion mailed Jan. 6, 2020 from International Patent Application PCT/US2019/057047, filed Oct. 18, 2019.
(Continued)

*Primary Examiner* — Emily P Pham
*Assistant Examiner* — Monica Mata
(74) *Attorney, Agent, or Firm* — FisherBroyles, LLP

(57) ABSTRACT

A non-resonant acoustic meta-material includes a layer of a first material formed on a first substrate and a layer of a second material formed on the layer of the first material to produce a stacked layer of first and second materials. At least a portion of the stacked layer of first and second materials is exposed to a radiation. The exposed portion of the second material is removed from the stacked layer of first and second materials. A cavity is formed using the removed exposed portion of the second material. The cavity includes a membrane formed from at least a portion of the first material. Additionally, an ultrasound system includes an
(Continued)

ultrasound transducer and the non-resonant acoustic metamaterial coupled to the ultrasound transducer.

15 Claims, 18 Drawing Sheets

(51) Int. Cl.
    *G01S 7/521*         (2006.01)
    *G01S 15/89*        (2006.01)
    *G10K 11/168*      (2006.01)
    *H10N 30/20*        (2023.01)
    *A61B 8/08*         (2006.01)

(52) U.S. Cl.
    CPC ....... *G10K 11/168* (2013.01); *H10N 30/2047* (2023.02); *A61B 8/0875* (2013.01)

(58) Field of Classification Search
    USPC .......................................................... 310/324
    See application file for complete search history.

(56) References Cited

U.S. PATENT DOCUMENTS

2008/0281205 A1* 11/2008 Naghavi ............... A61M 5/007 600/458
2016/0043253 A1   2/2016 Smith et al.
2018/0258923 A1* 9/2018 Marsh ................... F04B 43/023

OTHER PUBLICATIONS

Mace, E. et al. Functional ultrasound imaging of the brain. *Nat. Methods* 8, 662-664 (2011).
Osmanski, B. F., Pezet, S., Ricobaraza, A., Lenkei, Z. & Tanter, M. Functional ultrasound imaging of intrinsic connectivity in the living rat brain with high spatiotemporal resolution. Nat. Commun. 5, (2014).
Fry, F. J. & Barger, J. E. Acoustical properties of the human skull. *J. Acoust. Soc. Am.* 63, 1576-1590 (1978).
Hynynen, K. & Jolesz, F. A. Demonstration of potential noninvasive ultrasound brain therapy through an intact skull. *Ultrasound Med. Biol.* (1998). doi:10.1016/S0301-5629(97)00269-X.
White, P. J., Clement, G. T. & Hynynen, K. Local frequency dependence in transcranial ultrasound transmission. *Phys. Med. Biol.* 51, 2293-2305 (2006).
Legon, W. et al. Transcranial focused ultrasound modulates the activity of primary somatosensory cortex in humans. *Nat. Neurosci.* 17, 322-329 (2014).
Tufail, Y. et al. Transcranial Pulsed Ultrasound Stimulates Intact Brain Circuits. *Neuron* 66, 681-694 (2010).
Tufail, Y., Yoshihiro, A., Pati, S., Li, M. M. & Tyler, W. J. Ultrasonic neuromodulation by brain stimulation with transcranial ultrasound. Nat. Protoc. 6, (2011).
Fini, M. & Tyler, W. J. Transcranial focused ultrasound: a new tool for non-invasive neuromodulation. *Int. Rev. Psychiatry* 29, 168-177 (2017).
Strickland, D. Metamaterials: Challenges and opportunities. *Design, Test, Integration and Packaging of MEMS/MOEMS (DTIP), 2013 Symposium on* 1 (2013).
Cummer, S. A., Christensen, J. & Alù, A. Controlling sound with acoustic metamaterials. Nat. Rev. Mater. 1, 16001 (2016).
J., Krejza. Transcranial colour Doppler ultrasonography: State of the art. *Riv. di Neuroradiol.* 14, 309-319 (2001).
Hynynen, K. & Clement, G. Clinical applications of focused ultrasound—The brain. *Int. J. Hyperth.* (2007). doi:10.1080/02656730701200094.
Daffertshofer, M. & Hennerici, M. Ultrasound in the treatment of ischaemic stroke. *Lancet Neurology* 2, 283-290 (2003).
Hölscher, T. et al. Prehospital stroke diagnosis and treatment in ambulances and helicopters—a concept paper. *Am. J. Emerg. Med.* 31, 743-7 (2013).
Cummer, S. A. & Schurig, D. One path to acoustic cloaking. New J. Phys. 9, 0-8 (2007).
Chen, H. & Chan, C. T. Acoustic cloaking in three dimensions using acoustic metamaterials. *Appl. Phys. Lett.* 91, 1-4 (2007).
Cummer, S. A., Rahm, M. & Schurig, D. Material parameters and vector scaling in transformation acoustics. *New J. Phys.* 10, (2008).
Pendry, J. B. Negative refraction makes a perfect lens. *Phys. Rev. Lett.* 85, 3966-3969 (2000).
Pendry, J. B. & Ramakrishna, S. a. Focusing light using negative refraction. *J. Phys. Condens. Matter* 15, 6345-6364 (2003).
Zhang, S., Yin, L. & Fang, N. Focusing ultrasound with an acoustic metamaterial network. *Phys. Rev. Lett.* 102, 1-4 (2009).
Shen, C. et al. Broadband Acoustic Hyperbolic Metamaterial. *Phys. Rev. Lett.* 115, 1-5 (2015).
Zigoneanu, L., Popa, B.-I. & Cummer, S. A. Three-dimensional broadband omnidirectional acoustic ground cloak. Nat. Mater. 13, 352-355 (2014).
Shen, C., Xu, J., Fang, N. X. & Jing, Y. Anisotropic complementary acoustic metamaterial for canceling out aberrating layers. *Phys. Rev. X* 4, 041033 (2014).
Lai, Y. et al. Illusion optics: The optical transformation of an object into another object. *Phys. Rev. Lett.* 102, 1-4 (2009).
Lillie, E. M., Urban, J. E., Lynch, S. K., Weaver, A. A. & Stitzel, J. D. Evaluation of Skull Cortical Thickness Changes with Age and Sex from Computed Tomography Scans. *J. Bone Miner. Res.* 31, 299-307 (2016).
Hynynen, K. & Jolesz, F. A. Demonstration of potential noninvasive ultrasound brain therapy through an intact skull. *Ultrasound Med. Biol.* 24, 275-283 (1998).
Lee, S. H. & Wright, O. B. Origin of negative density and modulus in acoustic metamaterials. *Phys. Rev. B* 93, 1-14 (2016).
Grbic, A. & Eleftheriades, G. V. Growing evanescent waves in negative-refractive-index transmission-line media. *Appl. Phys. Lett.* 82, 1815-1817 (2003).
Grbic, A. & Eleftheriades, G. V. Overcoming the Diffraction Limit with a Planar Left-Handed Transmission-Line Lens. *Phys. Rev. Lett.* 92, 117403-1 (2004).
Bongard, F., Lissek, H. & Mosig, J. R. Acoustic transmission line metamaterial with negative/zero/positive refractive index. Phys. Rev. B—Condens. Matter Mater. Phys. 82, 24-26 (2010).
Schmid, S., Villanueva, L. G. & Roukes, M. L. *Fundamentals of nanomechanical resonators. Fundamentals of Nanomechanical Resonators* (2016). doi:10.1007/978-3-319-28691-4.
Wang, J. et al. [ASAP] Integration of Nanomaterials into Three-Dimensional Vertical Architectures. *ACS Appl. Mater. Interfaces* 10, 28262-28268 (2018).
Menz, M. D., Oralkan, O., Khuri-Yakub, P. T. & Baccus, S. A. Precise Neural Stimulation in the Retina Using Focused Ultrasound. J. Neurosci. 33, 4550-4560 (2013).
Hertzberg, Y., Naor, O., Volovick, A. & Shoham, S. Towards multifocal ultrasonic neural stimulation: Pattern generation algorithms. J. Neural Eng. 7, (2010).
Naor, O., Hertzberg, Y., Zemel, E., Kimmel, E. & Shoham, S. Towards multifocal ultrasonic neural stimulation II: Design considerations for an acoustic retinal prosthesis. J. Neural Eng. 9, (2012).
Wong, Z. J. et al. Optical and acoustic metamaterials: Superlens, negative refractive index and invisibility cloak. J. Opt. (United Kingdom) 19, (2017).
Zorlutuna, P. et al. Microfabricated biomaterials for engineering 3D tissues. Adv. Mater. 24, 1782-1804 (2012).
Frenzel, T., Kadic, M. & Wegener, M. Three-dimensional mechanical metamaterials with a twist. Science (80-.). 358, 1072-1074 (2017).
O'Reilly, M. A., Muller, A. & Hynynen, K. Ultrasound Insertion Loss of Rat Parietal Bone Appears to Be Proportional to Animal Mass at Submegahertz Frequencies. Ultrasound Med. Biol. 37, 1930-1937 (2011).
Moazen, M., Peskett, E., Babbs, C., Pauws, E. & Fagan, M. J. Mechanical properties of calvarial bones in a mouse model for craniosynostosis. PLoS One 10, 1-13 (2015).

(56) References Cited

OTHER PUBLICATIONS

Lee, S. H., Park, C. M., Seo, Y. M., Wang, Z. G. & Kim, C. K. Composite acoustic medium with simultaneously negative density and modulus. Phys. Rev. Lett. (2010). doi:10.1103/PhysRevLett.104.054301.

Huang, T.-Y., Shen, C. & Jing, Y. Membrane- and plate-type acoustic metamaterials. J. Acoust. Soc. Am. 139, 3240-3250 (2016).

Yang, J. & Vazquez-Mena, O. Fabrication of three-dimensional vertical architecture based on suspended films with nanomaterial integration. Prep.

Friend, J. & Yeo, L. Y. Microscale acoustofluidics: Microfluidics driven via acoustics and ultrasonics. Rev. Mod. Phys. 83, 647-704 (2011).

Ibsen, S., Tong, A., Schutt, C., Esener, S. & Chalasani, S. H. Sonogenetics is a non-invasive approach to activating neurons in Caenorhabditis elegans. Nat. Commun. 6, 1-12 (2015).

Vazquez-Mena, O. et al. Sub-100 nm-scale Aluminum nanowires by stencil lithography: Fabrication and characterization. in 3rd IEEE International Conference on Nano/Micro Engineered and Molecular Systems, NEMS (2008). doi: 10.1109/NEMS.2008.4484447.

Villanueva, G. et al. Etching of sub-micrometer structures through Stencil. Microelectron. Eng. 85, (2008).

Sidler, K., Villanueva, G., Vazquez-Mena, O. & Brugger, J. Minimized blurring in stencil lithography using a compliant membrane. in Transducers 2009—15th International Conference on Solid-State Sensors, Actuators and Microsystems (2009). doi:10.1109/Sensor.2009.5285768.

Vazquez-Mena, O. et al. Analysis of the blurring in stencil lithography. Nanotechnology 20, (2009).

Vazquez-Mena, O. et al. Metallic nanowires by full wafer stencil lithography. Nano Lett. 8, 3675-3682 (2008).

Vazquez-Mena, O., Sannomiya, T., Villanueva, L. G., Voros, J. & Brugger, J. Metallic nanodot arrays by stencil lithography for plasmonic biosensing applications. ACS Nano 5, 844-853 (2011).

Vazquez-Mena, O. et al. Reliable and improved nanoscale stencil lithography by membrane stabilization, blurring, and clogging corrections. IEEE Trans. Nanotechnol. 10, 352-357 (2011).

Sidler, K., Villanueva, L. G., Vazquez-Mena, O., Savu, V. & Brugger, J. Compliant membranes improve resolution in full-wafer micro/nanostencil lithography. Nanoscale 4, 773 (2012).

Bartok, B. & Firestein, G. S. Fibroblast-like synoviocytes: key effector cells in rheumatoid arthritis. Immunological reviews 233, 233-255 (2010).

Bugatti, S., Manzo, A., Caporali, R. & Montecucco, C. Inflammatory lesions in the bone marrow of rheumatoid arthritis patients: a morphological perspective. Arthritis Research & Therapy 14, 229-229 (2012).

Borrero, C. G., Mountz, J. M. & Mountz, J. D. Emerging mri methods in rheumatoid arthritis. Nat Rev Rheumatol 7, 85-95 (2011).

Vande Berg, B. C., Malghem, J., Lecouvet, F. E. & Maldague, B. Magnetic resonance imaging of normal bone marrow. European Radiology 8, 1327-1334 (1998).

Lowitz, T. et al. Bone marrow lesions identified by {MRI} in knee osteoarthritis are associated with locally increased bone mineral density measured by {QCT}. Osteoarthritis and Cartilage 21, 957-964 (2013).

McQueen, F. M. et al. Magnetic resonance imaging of the wrist in early rheumatoid arthritis reveals a high prevalence of erosions at four months after symptom onset. Annals of the Rheumatic Diseases 57, 350-356 (1998).

Schett, G. Bone marrow edema. Annals of the New York Academy of Sciences 1154, 35-40 (2009).

Sudo?-Szopi'nska, I. et al. Significance of bone marrow edema in pathogenesis of rheumatoid arthritis. Polish Journal of Radiology 78, 57-63 (2013).

McGonagle, D., Ash, Z. R., Hodgson, R. J., Emery, P. & Radjenovic, A. MRI for the assessment and monitoring of ra-what can it tell US? Nat Rev Rheumatol 7, 185-189 (2011).

Bøyesen, P. et al. MRI in early rheumatoid arthritis: synovitis and bone marrow oedema are independent predictors of subsequent radiographic progression. Annals of the Rheumatic Diseases 70, 428-433 (2011).

Nieuwenhuis, W. P. et al. The course of bone marrow edema in early undifferentiated arthritis and rheumatoid arthritis: A longitudinal magnetic resonance imaging study at bone level. Arthritis & Rheumatology 68, 1080-1088 (2016).

Eshed, I. et al. MRI of enthesitis of the appendicular skeleton in spondyloarthritis. Annals of the Rheumatic Diseases 66, 1553-1559 (2007).

Shaikh, S. A. Ankylosing spondylitis: recent breakthroughs in diagnosis and treatment. The Journal of the Canadian Chiropractic Association 51, 249-260 (2007).

Ohrndorf, S. & Backhaus, M. Musculoskeletal ultrasonography in patients with rheumatoid arthritis. Nat Rev Rheumatol 9, 433-437 (2013).

Njeh, C. F. & Genant, H. K. Bone loss: Quantitative imaging techniques for assessing bone mass in rheumatoid arthritis. Arthritis Research 2, 446-450 (2000).

Li, H. et al. A universal, rapid method for clean transfer of nanostructures onto various substrates. ACS nano 8, 6563-6570 (2014).

Li, Z. et al. Laminated carbon nanotube networks for metal electrode-free efficient perovskite solar cells. ACS nano 8, 6797-6804 (2014).

Novoselov, K., Mishchenko, A., Carvalho, A. & Neto, A. C. 2D materials and van der Waals heterostructures. Science 353, aac9439 (2016).

Wang, X. & Xia, F. Van der waals heterostructures: Stacked 2D materials shed light. Nature materials 14, 264-265 (2015).

Geim, A. K. & Grigorieva, I. V. Van der waals heterostructures. Nature 499, 419-425 (2013).

Chang, K. P. et al. Memory architecture of 3d vertical gate (3DVG) NAND flash using plural island-gate SSL decoding method and study of it's [sic] program inhibit characteristics. In Fourth IEEE International Memory Workshop, 1-4 (2012).

Vazquez-Mena, O., Gross, L., Xie, S., Villanueva, L. G. & Brugger, J. Resistless nanofabrication by stencil lithography: A review. Microelectronic Engineering 132, 236-254 (2015).

Vazquez-Mena, O. et al. Performance enhancement of a graphene-zinc phosphide solar cell using the electric field-effect. Nano Letters 14, 4280-4285 (2014).

Yudistira, D. et al. Monolithic phononic crystals with a surface acoustic band gap from surface phonon-polariton coupling. Physical Review Letters 113, 215503 (2014).

Rezk, A. R. et al. Acoustic-excitonic coupling for dynamic photoluminescence manipulation of quasi-2d mos2 nanoflakes. Advanced Optical Materials 3, 888-894 (2015).

Zhang, X. et al. Nanofabrication of highly ordered, tunable metallic mesostructures via quasi-hard-templating of lyotropic liquid crystals. Scientific Reports 4, 1-5 (2014).

Yudistira, D. et al. Polariton-based band gap and generation of surface acoustic waves in acoustic superlattice lithium niobate. Journal of Applied Physics 114, 1-6 (2013).

Watson, B., Friend, J. & Yeo, L. Piezoelectric ultrasonic micro/milli-scale actuators. Sensors and Actuators A: Physical 152, 219-233 (2009).

Culjat, M. O., Goldenberg, D., Tewari, P. & Singh, R. S. A review of tissue substitutes for ultrasound imaging. Ultrasound in medicine & biology 36, 861-873 (2010).

Rho, J.-Y., Kuhn-Spearing, L. & Zioupos, P. Mechanical properties and the hierarchical structure of bone. Medical Engineering & Physics 20, 92-102 (1998).

Sasaki, N., Umeda, H., Okada, S., Kojima, R. & Fukuda, A. Mechanical properties of hydroxyapatite-reinforced gelatin as a model system of bone. Biomaterials 10, 129-132 (1989).

Clarke, A. J., Evans, J. A., Truscott, J. G., Milner, R. & Smith, M. A. A phantom for quantitative ultrasound of trabecular bone. Physics in medicine and biology 39, 1677 (1994).

Leydet-Quilici, H. et al. Advanced hip osteoarthritis: magnetic resonance imaging aspects and histopathology correlations. Osteoarthritis and Cartilage 18, 1429-1435 (2010).

(56) References Cited

OTHER PUBLICATIONS

Reeder, S. B. et al. Iterative decomposition of water and fat with echo asymmetry and least-squares estimation (ideal): Application with fast spin-echo imaging. Magnetic Resonance in Medicine 54, 636-644 (2005).
Wang, K., Yu, H., Brittain, J. H., Reeder, S. B. & Du, J. k-space water-fat decomposition with t2* estimation and multifrequency fat spectrum modeling for ultrashort echo time imaging. Journal of Magnetic Resonance Imaging 31, 1027-1034 (2010).
Bydder, M., Girard, O. & Hamilton, G. Mapping the double bonds in triglycerides. Magnetic Resonance Imaging 29, 1041-1046 (2011).
Hamilton, G., Smith, D. L., Bydder, M., Nayak, K. S. & Hu, H. H. Magnetic resonance properties of brown and white adipose tissues. Journal of magnetic resonance imaging : JMRI 34, 468-473 (2011).
Ren, J., Dimitrov, I., Sherry, A. D. & Malloy, C. R. Composition of adipose tissue and marrow fat in humans by 1h nmr at 7 tesla. Journal of Lipid Research 49, 2055-2062 (2008).
Field, C. J., Angel, A. & Clandinin, M. T. Relationship of diet to the fatty acid composition of human adipose tissue structural and stored lipids. The American Journal of Clinical Nutrition 42, 1206-20 (1985).
Sartoris, D. J., André, M., Resnik, C. S., Resnick, D. & Resnick, C. Trabecular bone density in the proximal femur: quantitative ct assessment. work in progress. Radiology 160, 707-712 (1986).
Lin, S. C. et al. Noninvasive diagnosis of nonalcoholic fatty liver disease and quantification of liver fat using a new quantitative ultrasound technique. Clinical Gastroenterology and Hepatology 13, 1337-1345.e6 (2015).
Han, A. et al. Repeatability and reproducibility of a clinically based qus phantom study and methodologies. IEEE Transactions on Ultrasonics, Ferroelectrics, and Frequency Control 64, 218-231 (2017).
Perkins, A. C. et al. Human biodistribution of an ultrasound contrast agent (quantison) by radiolabelling and gamma scintigraphy. The British Journal of Radiology 70, 603-611 (1997).
Boutry, N., Morel, M., Flipo, R.-M., Demondion, X. & Cotten, A. Early rheumatoid arthritis: A review of mri and sonographic findings. American Journal of Roentgenology 189, 1502-1509 (2007).
Carter, D. R. & Hayes, W. C. The compressive behavior of bone as a two-phase porous structure. The Journal of Bone & Joint Surgery 59, 954-962 (1977).
Aletaha, D. et al. 2010 rheumatoid arthritis classification criteria: an american college of rheumatology/European league against rheumatism collaborative initiative. Annals of the Rheumatic Diseases 69, 1580-1588 (2010).
Østergaard, M. et al. Omeract rheumatoid arthritis magnetic resonance imaging studies. core set of mri acquisitions, joint pathology definitions, and the omeract ra-mri scoring system. The Journal of Rheumatology 30, 1385-1386 (2003).
Perera, R. H. et al. Ultrasound imaging beyond the vasculature with new generation contrast agents. Wiley Interdisciplinary Reviews: Nanomedicine and Nanobiotechnology 7, 593-608 (2015).

\* cited by examiner

NON-RESONANT ACOUSTIC METAMATERIAL FOR RENDERING OBJECTS TRANSPARENT TO ULTRASOUND

CROSS-REFERENCE TO RELATED APPLICATIONS

The present application claims priority to and is a national stage entry of International Application No. PCT/US2019/057047 to Guma et al., filed on Oct. 18, 2019, and entitled "System and Method for Rendering Objects Transparent to Ultrasound," which claims priority to U.S. Provisional Patent Appl. No. 62/747,641 to Guma et al., filed on Oct. 18, 2018, and entitled "Method for Rendering Cortical Bone Transparent to Ultrasound," and incorporates their disclosures herein by reference in their entireties.

GOVERNMENT LICENSE RIGHTS

This invention was made with government support under D18AP00062 awarded by Defense Advanced Research Projects Agency. The government has certain rights in the invention.

BACKGROUND

Ultrasound is an effective imaging technique that is used by medical professionals for non-invasively imaging various tissues inside a body of the patient. However, in some cases, ultrasound cannot be effectively used. For example, ultrasound cannot be used to effectively penetrate a cortical bone. The transition to cortical bone from soft tissue outside when using an ultrasound transducer aberrates ultrasound waves, rendering it impossible to refocus for the purposes of detection and/or imaging. As such, many potential medical diagnostic and/or treatment methods cannot be used, leaving medical professionals to rely on other tools for diagnosis, imaging, treatment, etc., e.g., a magnetic resonance imaging (MRI) which is costly.

One such challenging diagnostic problem that cannot be currently diagnosed using ultrasound is rheumatoid arthritis (RA). RA is a debilitating, chronic systemic autoimmune disease of the synovial joints that leads to joint destruction and loss of function for ~1% of the worldwide population. Early bone damage due to RA is correlated with poor long-term patient outcomes, and bone marrow lesions—especially, bone marrow edema (BME)—are a useful prognostic indicator of disabling RA. Because ultrasound cannot cross cortical bone to image the bone marrow within, MRI has been used to detect BME (at a significant cost). However, MRI cannot be used in every case. For example, MRI cannot be used on patients with joint replacement and other types of metal implants. Further, some patients also encounter adverse side effects from the gadolinium contrast agent administered prior to MRI procedures. Hence, there is a need for an improved approach for using ultrasound to diagnose, image, treat, etc. various medical conditions.

SUMMARY

In some implementations, the current subject matter relates to a method for fabricating a non-resonant acoustic metamaterial (NRAM). The method may include forming a layer of a first material on a first substrate, forming a layer of a second material on the layer of the first material to produce a stacked layer of first and second materials, exposing at least a portion of the stacked layer of first and second materials to a radiation, removing the exposed portion of the second material from the stacked layer of first and second materials, and forming a cavity using the removed exposed portion of the second material, wherein the cavity includes a membrane formed from at least a portion of the first material.

In some implementations, the current subject matter may include one or more of the features disclosed herein including following optional features. The method may include removing at least a portion of the first substrate subsequent to the forming of the layer of a second material on the layer of the first material. The method may also include transferring the stacked layer of the first and second materials onto a second substrate.

In some implementations, the stacked layer of the first and second materials may include a plurality of alternating layers of the first material and the second material. In some implementations, the removing may further include removing a plurality of layers of the second materials from the stacked layer of the first and second materials while retaining a plurality of first materials. The cavity may include a plurality of portions of layers of the first material forming a plurality of membranes. Further, the plurality of membranes may be configured to resonate at a predetermined operating frequency and configured to shift phase and/or amplitude of one or more ultrasound waves passing through the cavity. The predetermined operating frequency may be in a range of approximately 100 KHz to approximately 250 MHz.

In some implementations, the first material may be a hard material and the second material is a soft material. The first material may include at least one of the following: a silicon oxide, a silicon nitride, a graphene, a diamond, a metal nitride, a metal carbide, a silicon carbide, a metal oxide, a metal oxide bilayer, a silicon oxide bilayer, metal nitride bilayer, silicon nitride bilayer, aluminum nitride, aluminum carbide, aluminum oxide, aluminum oxide bilayer, aluminum nitride bilayer, chromium nitride, chromium carbide, chromium oxide, chromium oxide bilayer, chromium nitride bilayer, and any combinations thereof. Any other metal may also be used. The second material may include at least one of the following: a polymethyl methacrylate (PMMA) material, SU-8 material, silicon, polymer, and any combinations thereof.

In some implementations, the cavity may be filled with at least one of the following: a fluid, a gas, and any combinations thereof.

In some implementations, the cavity may be configured to be connected to at least another cavity formed in at least another second layer and further configured to be separated from at least another cavity by at least one of: the membrane and at least another membrane.

In some implementations, the current subject matter relates to a non-resonant acoustic metamaterial apparatus that may be formed in accordance with the method above. The apparatus may include a layer of a first material on a first substrate, a layer of a second material formed on the layer of the first material to produce a stacked layer of first and second materials and a cavity. The cavity may be formed by exposing at least a portion of the stacked layer of first and second materials to a radiation, removing the exposed portion of the second material from the stacked layer of first and second materials, and forming the cavity using the removed exposed portion of the second material, wherein the cavity includes a membrane formed from at least a portion of the first material. The apparatus may include some of the optional features discussed above.

In some implementations, the current subject matter relates to an ultrasound system that may include an ultrasound transducer and the non-resonant acoustic metamaterial coupled to the ultrasound transducer having features discussed above.

In some implementations, there is provided a method for rendering cortical bone that is transparent to conventional ultrasound. The method may include introducing an acoustic metamaterial layer between a standard ultrasound clinical imaging probe and the soft tissues adjacent to the target bone marrow imaging region, thereby compensating for the subsequent aberration of the cortical bone as the ultrasound makes its way to and from the marrow and trabecular structure within. The acoustic metamaterial layer may be formed from a non-resonant acoustic metamaterial (NRAM) that is suitable for the transmission of ultrasound at clinically relevant frequencies through a cortical bone analog.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the rendering of objects using ultrasound, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1A:
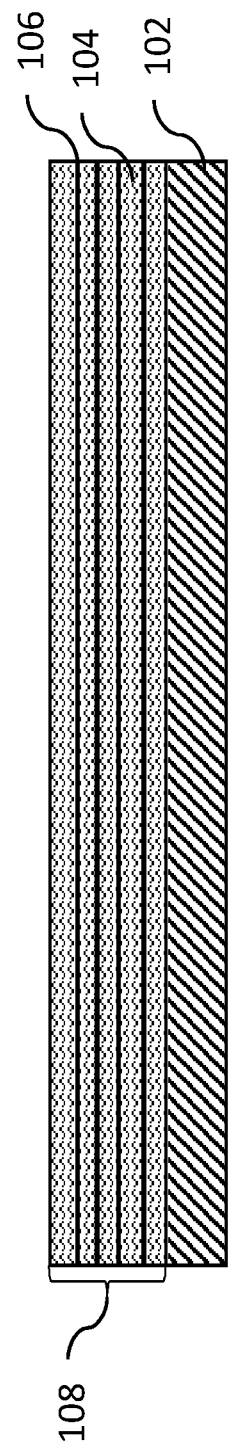
FIGS. 1a-1e illustrate an exemplary process for forming a non-resonant acoustic metamaterial (NRAM), according to some implementations of the current subject matter.

In some implementations, the current subject matter provides an ability to make it possible to effectively transmit ultrasound waves across different types of tissues (e.g., cortical bone, and/or other tissues) for the purposes of imaging, detection, diagnosis, treatment, etc. using ultrasound. The current subject matter relates to a non-resonant acoustic metamaterial (NRAM) layer that may be positioned between a standard ultrasound clinical imaging probe and soft and/or any other tissues of the patient (e.g., adjacent to the target bone marrow imaging region). Such non-resonant acoustic metamaterial may be configured to compensate for any subsequent aberration (e.g., as the ultrasound waves traverse cortical bone on its way to and from the marrow and trabecular structure within). The NRAM materials may be used with a variety of ultrasound frequencies for traversal of various tissues (e.g., soft tissue, cortical bone, etc.), objects, etc. The current subject matter's system, method, material, etc. may also be used for a variety of purposes, including medical as well as non-medical purposes and/or uses.

For ease of illustration only, the following description will be presented in connection with using the NRAM material together with an ultrasound probe for transmission of ultrasound waves at various frequencies through a cortical bone. However, as can be understood and as stated above, the current subject matter may be used for any other purposes (e.g., neurointervention to osteoarthritis, myeloma, peripheral musculoskeletal injuries, imaging of any human/animal/organic/inorganic/etc. tissues, any objects, etc.).

In some implementations, the NRAM material may be fabricated via a combination of nanofabrication methods and/or guidance of non-contact acoustic measurements. The NRAM material may be a layer that may possess a negative density and stiffness along the ultrasound wave propagation direction. The NRAM materials may be a composite with regularly-spaced, fluid-filled internal cavities having a size smaller than the wavelength of the ultrasound. When ultrasound waves pass through the NRAM material from an ultrasound source to the target tissue and back to the source (i.e., each way via other soft tissue and hard tissue (e.g., the cortical bone)), the NRAM material may be configured to compensate for the aberration (or incoherency) that may induced by the interfering tissues and/or objects (e.g., cortical bone and/or other tissues). Thus, various implementations of the current subject matter may enable use of ultrasound to characterize, image, treat, etc. tissues beyond interfering tissues and/or objects (e.g., cortical bone, other soft tissues, etc.). Through the design and construction of NRAM attached to an ultrasound transducer, in some exemplary, non-limiting implementations, the cortical bone may be rendered transparent to the ultrasound, thereby facilitating characterization, imaging, treatment, etc. of the bone marrow.

In some implementations, the NRAM material may be fabricated using 3-dimensional nanofabrication methods. The methods may be based on stacking and/or on multilayer nanostructuring techniques, which in some exemplary, non-limiting, implementations, may have a resolution of less than 1 μm, which is less than ultrasound-relevant wavelengths. The NRAM material may be configured to be used with ultrasound frequencies from approximately 100 kHz to at least 250 MHz.

In some exemplary, non-limiting implementations, the NRAM material, when used together with an ultrasound transducer, may be used to characterize and/or diagnose presence of bone marrow lesions via quantitative ultrasound (QUS). Further, NRAM material together with an ultrasound transducer may be used to detect, diagnose, etc. BME in the small joints of RA patients with and/or without BME. As can be understood, the NRAM material when used together with any ultrasound system may be used for the purposes of scanning, imaging, detection, diagnosis, treatment, etc. of objects, tissues, materials, etc. (whether animate and/or inanimate).

In some implementations, the current subject matter's NRAM material may be used for efficiently passing acoustic waves through high acoustic impedance materials (such as bone and/or metal objects), surrounded by relatively low acoustic impedance materials (e.g., tissue, water, etc.). The NRAM material may have a substantially crystalline structure (e.g., millimeter to micrometer-scale structure) that may include high and/or low density elastic media at dimensions that may be smaller than the wavelength of the acoustic waves. The current subject matter's NRAM material may produce negative density and/or stiffness values in a desired direction by having one or more cavities disposed therein.

In some exemplary, non-limiting implementations, the current subject matter's NRAM material may have one or more layers approximately 50 nm thick and lateral features approximately 250 nm. The NRAM material may be configured to enable passing of up to 250 MHz ultrasound through 400 μm of cortical bone to generate coherent ultrasound waves, facilitate bone marrow characterization, etc. Upon reflection, the ultrasound waves may reform in a coherent fashion to generate imagery. Thus, the current subject matter's NRAM material may be configured to operate in both directions (from source to target and from target to source).

FIGS. 1a-1e illustrate an exemplary step-by-step process for forming a non-resonant acoustic metamaterial 100, according to some implementations of the current subject matter. FIGS. 2a and 2b illustrate an exemplary top view and perspective top view, respectively, of the NRAM material formed by the process shown in FIGS. 1a-1e.

Figure 2A:
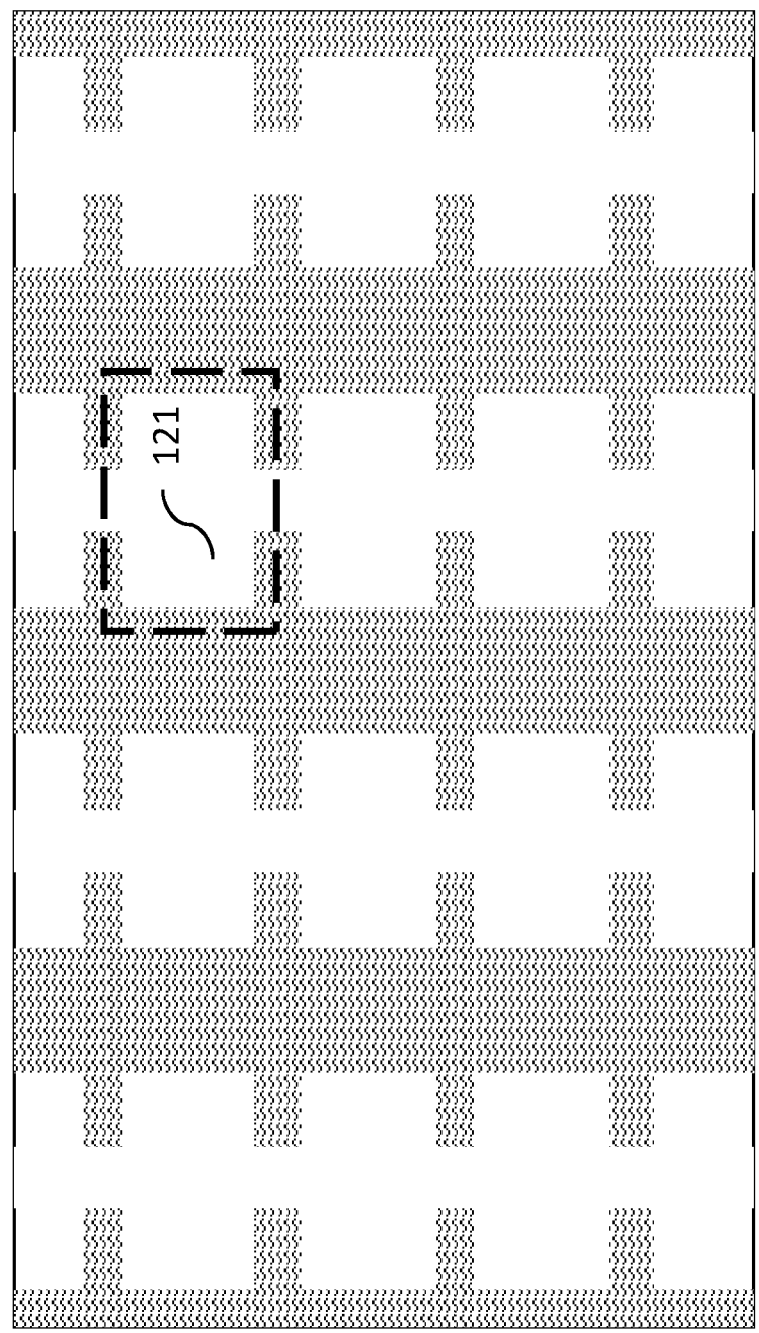
FIGS. 2a and 2b illustrate an exemplary top view and perspective top view, respectively, of the NRAM material formed by the process shown in FIGS. 1a-1e, according to some implementations of the current subject matter.
Figure 2B:
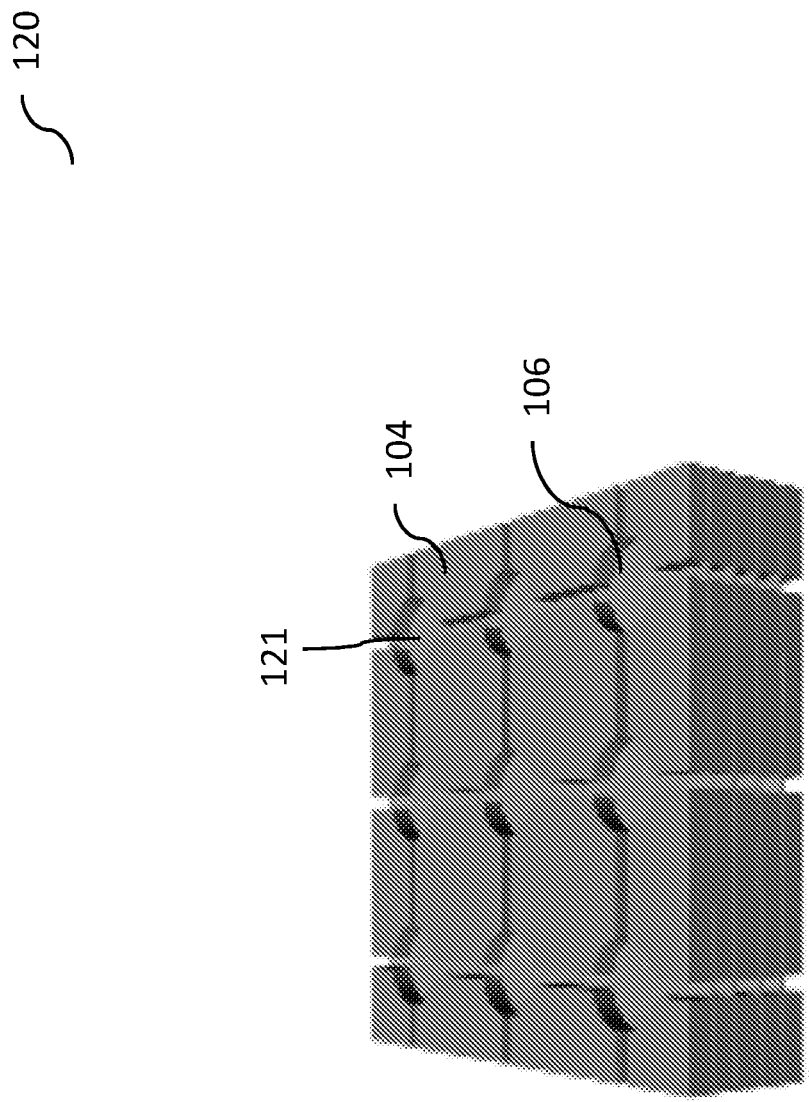

Referring to FIG. 1a, the process for forming a non-resonant acoustic metamaterials 100 may be initiated by providing a pre-fabrication substrate 102. A patterned polymer layer 104 may then be deposited on the substrate 102. The patterned polymer layer 104 may include a polymethyl methacrylate (PMMA) material, SU-8 material (a Bisphenol A Novolac epoxy dissolved in an organic solvent (e.g., gamma-butyrolactone GBL, cyclopentanone) and up to 10 wt % of mixed triarylsulfonium/hexafluoroantimonate salt (a photoacid generator)), silicon, polymer, and/or any other material. A layer 106 of thin, stiff material may then be deposited on the patterned polymer layer 104. For example, the layer 106 may be a silicon oxide ($SiO_2$), silicon nitride (SiN), graphene, a graphene, a diamond, a metal nitride, a metal carbide, a silicon carbide, a metal oxide, a metal oxide bilayer, a silicon oxide bilayer, metal nitride bilayer, silicon nitride bilayer, aluminum nitride, aluminum carbide, aluminum oxide, aluminum oxide bilayer, aluminum nitride bilayer, chromium nitride, chromium carbide, chromium oxide, chromium oxide bilayer, chromium nitride bilayer, and/or any other material. Any other metals and/or materials may also be used. One or more combinations of layers 104 and 106 may be stacked on top of each other to form a stacked layer 108, as shown in FIG. 1a.

Figure 1B:
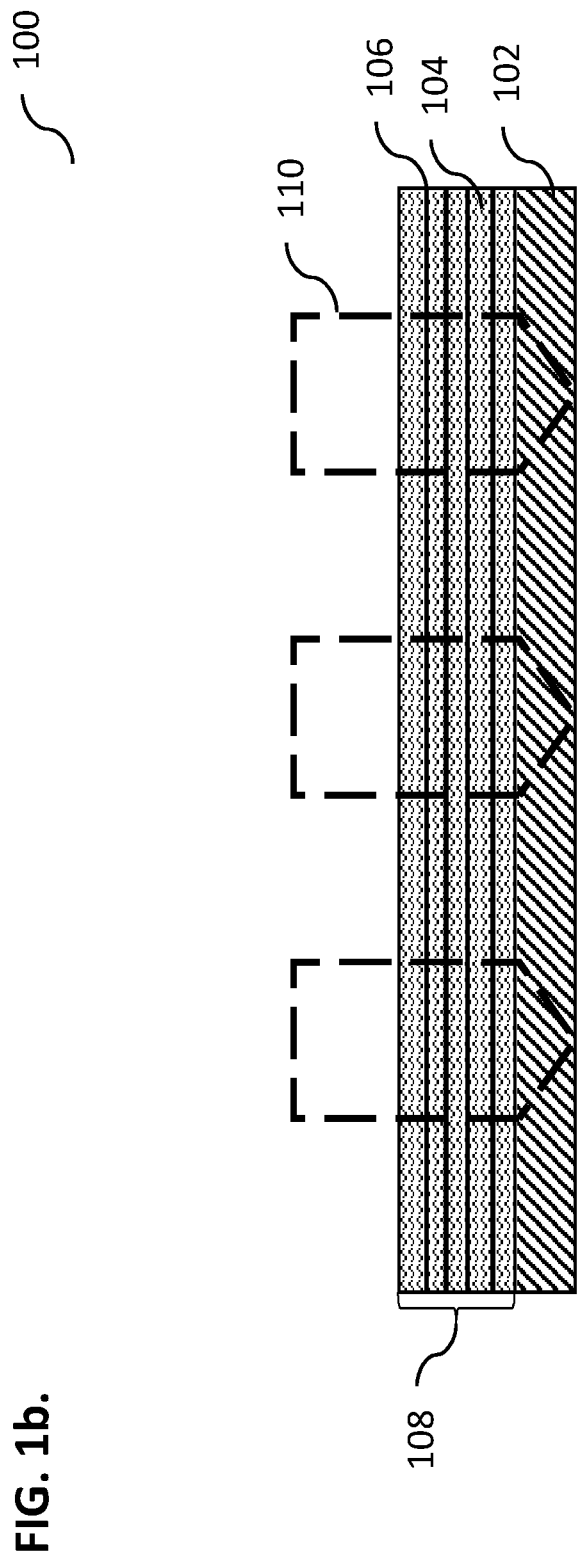
Figure 1C:
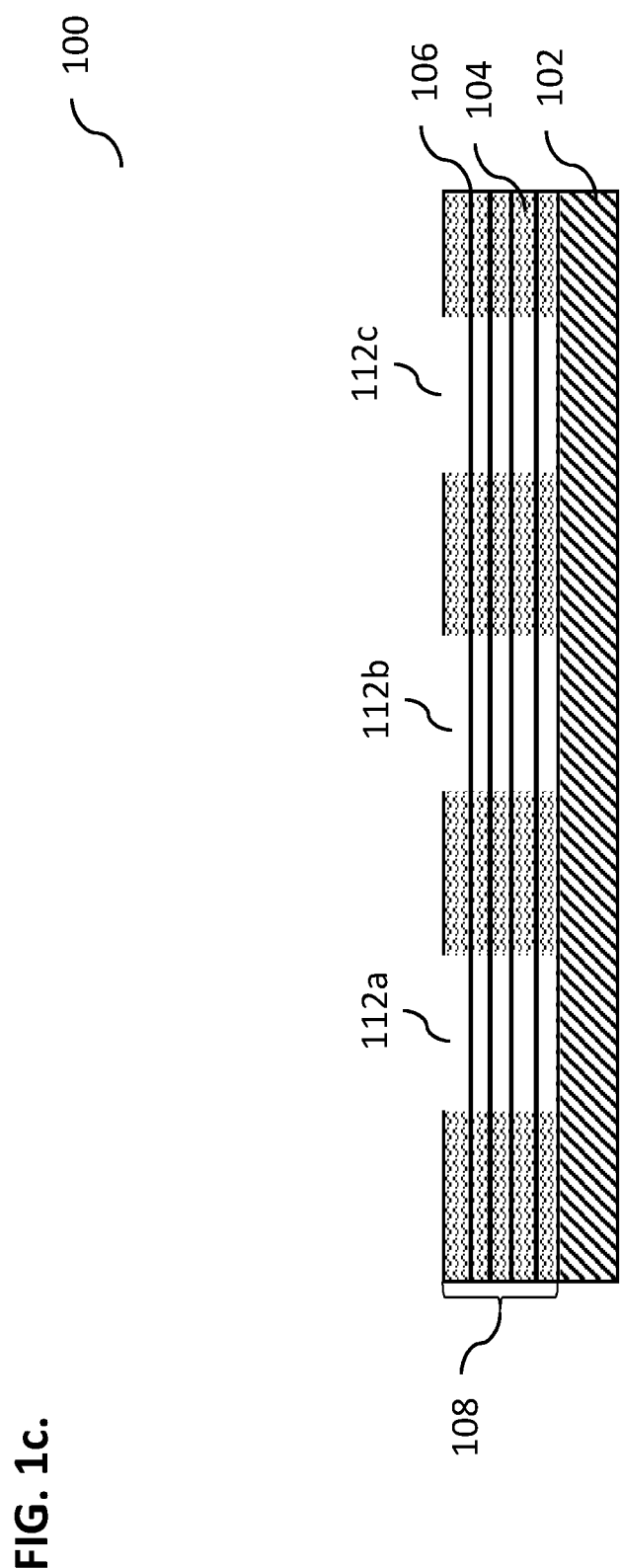

To form cavities, the stacked layer 108 may be exposed to an electron beam 110, as shown in FIG. 1b, to remove portions of the soft photoresist material 106, as shown in FIG. 1c. In some implementations, one or more portions of and/or the entire stiff material 104 might not be removed. Removal of the portions of material 106 may be configured to form cavities 112(a, b, c), as shown in FIG. 1c. The cavities 112 may have any desired shape, e.g., round, square, rectangular, oval, and/or any other desired shape. Any number of cavities may be formed. In some implementations, the number of cavities may be formed in accordance with a particular ultrasound application, ultrasound probe, and/or any other factors. The cavities 112 may be formed using electron beam photolithography and/or any other methods.

Figure 1D:
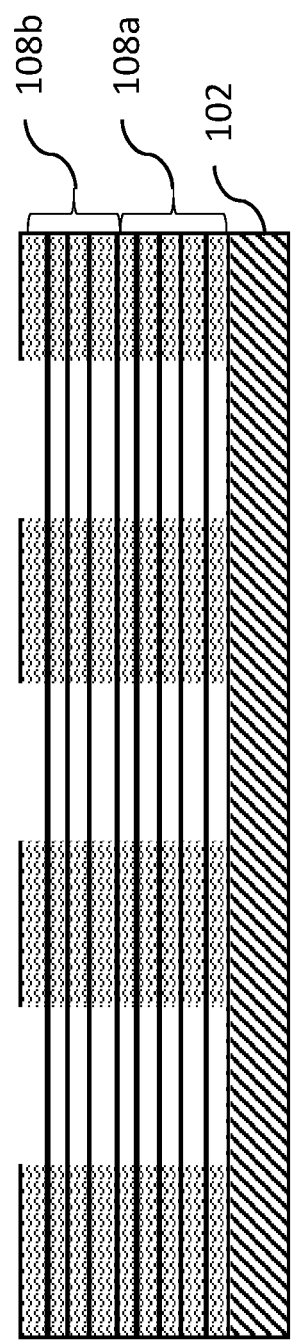
Figure 1E:
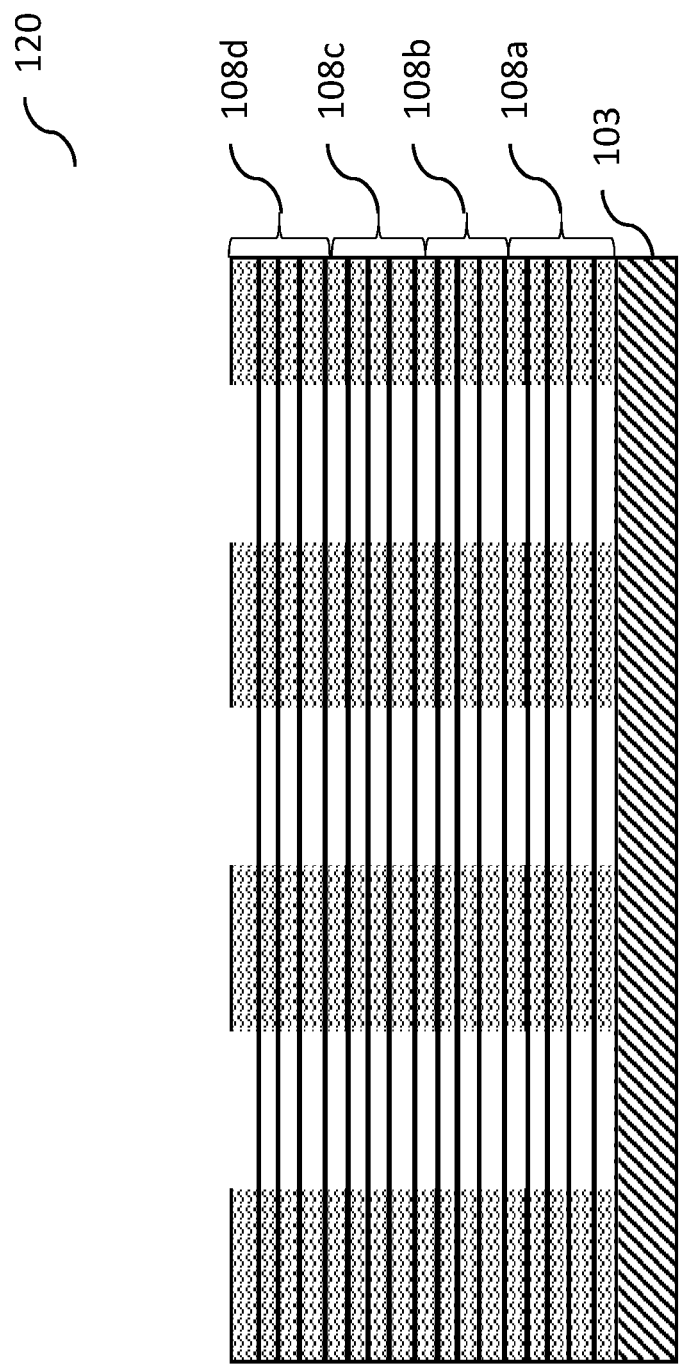

In some implementations, the stacked layer 108 may include any number of layers of the soft material 106 and stiff material 104. The number of layers of materials 104, 106 may be selected in accordance with a particular ultrasound application, ultrasound probe, and/or any other factors. Referring to FIGS. 1d-1e, the layers 108 may be stacked on top of one another to form stacked structures 115 (having two layers 108a, 108b, as shown in FIG. 1d) or 120 (having four layers 108(a, b, c, d), as shown in FIG. 1e). The stacking of layers 108 may be configured to position one or more cavities under one another, where the stiff materials 104 may be configured to separate one cavity from another below it in a vertical plane. Soft materials 106 may be configured to separate neighboring cavities in a horizontal plane.

In some implementations, the layers 108 may be deposited and/or structured on a prefabrication substrate 102 and then transferred onto a final stacking substrate 103 (as shown in FIG. 1e). The stacking of layers 108 may be configured to form the metamaterial up to a desired thickness that may be needed for the ultrasound to penetrate the desired objects, tissues, etc. (e.g., cortical bone, and/or any other tissues, depending on a particular application). The thickness of the final metamaterial may be determined in accordance with a particular ultrasound application, ultrasound probe, and/or any other factors.

Figure 2C:
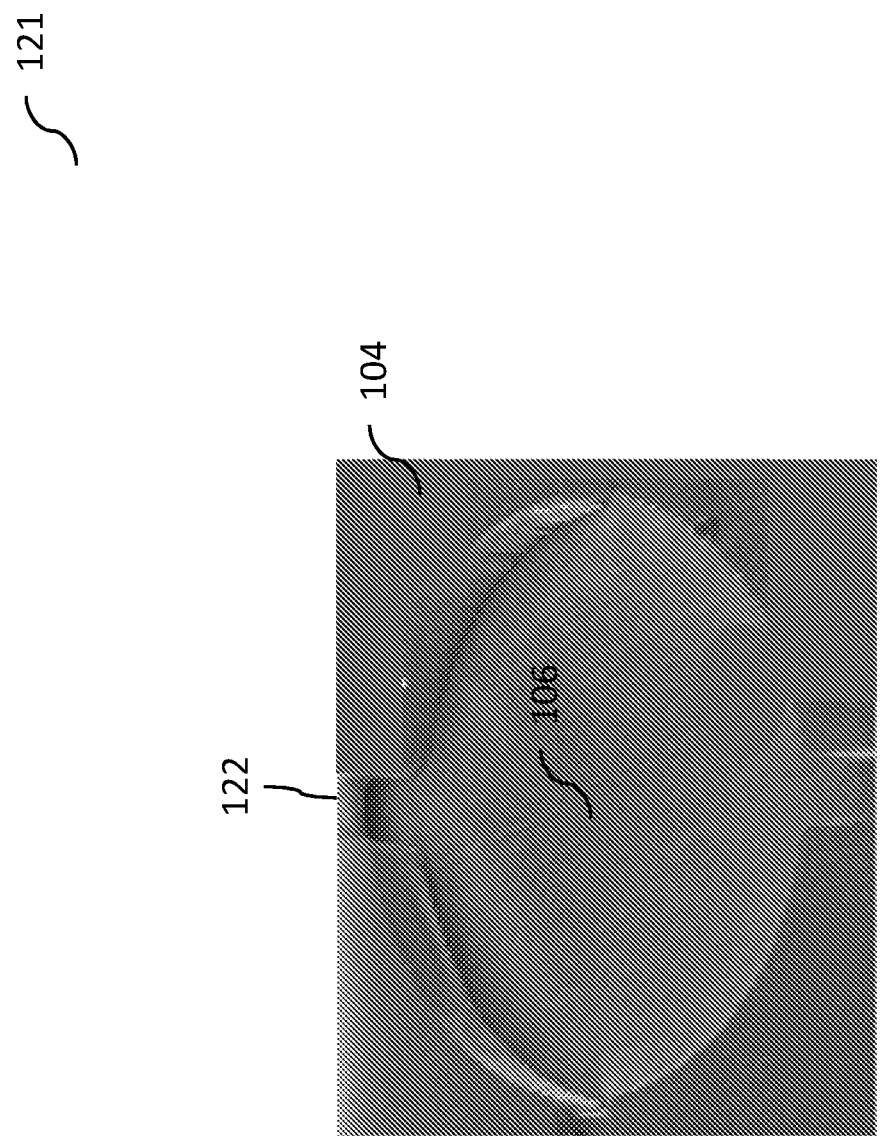
FIG. 2c exemplary cuboid cavity, according to some implementations of the current subject matter.

FIG. 2a is a top view of the stacked metamaterial 120 having one or more cavities 121. FIGS. 2b-c show a perspective view of the metamaterial 120 and a cavity 121, respectively. As shown in FIGS. 2a-c, material 104 may form the "bottom" of the cavity 121 and the material 106 may form the "sidewalls" of the cavity 121. While FIGS. 2b-c illustrate circular cavities 121, other shapes of cavities 121 are possible.

Figure 3:
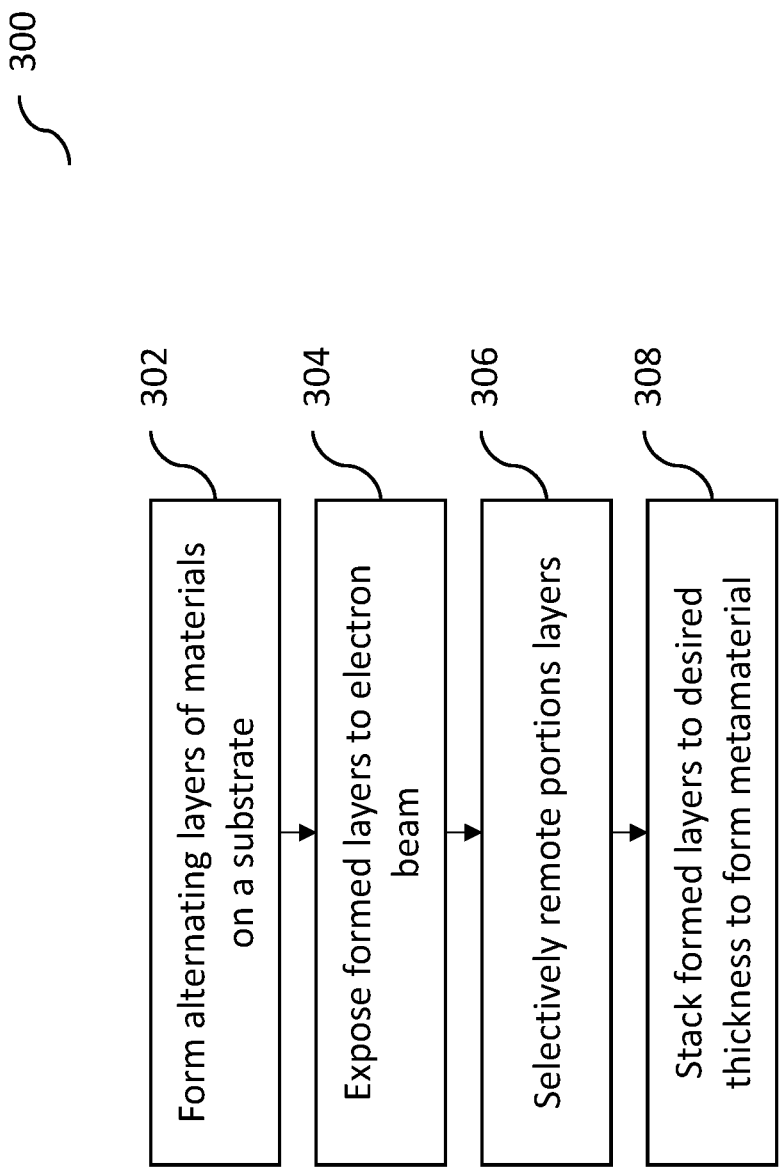
FIG. 3 illustrates an exemplary process for forming the non-resonant acoustic metamaterial, according to some implementations of the current subject matter.

FIG. 3 illustrates an exemplary process 300 for forming the non-resonant acoustic metamaterial, according to some implementations of the current subject matter. At 302, alternating layers of materials (e.g., soft material 104 and stiff material 106) may formed on a substrate (e.g., a prefabrication substrate 102). Any number of alternating layers may be formed to form a stacked structure or layer 108. The stacked structure 108 may be exposed to an electron beam, at 304 (e.g., as shown in FIG. 1b). At 306, exposed portions (e.g., the soft material 106) of the stacked structure 108 may be selectively removed from the stacked layer 108. Then, the modified structure 108 may be stacked with one or more other modified structures 108 on a substrate (e.g., final substrate 103 as shown in FIG. 1e), while aligning the structures 108 to ensure that the removed portions or cavities are positioned under each other, to form the metamaterial, at 308.

In some exemplary, non-limiting, implementations, the NRAM material may controllably scatter ultrasound waves prior to passage through skin, muscle, bone, and/or any other tissues and/or objects to compensate for the presence of the cortical bone along the ultrasound wave propagation path, thereby producing a coherent, focused ultrasound beam after passage through the cortical bone for characterization, imaging, etc. of tissue beyond it. The NRAM material may be configured to scatter the ultrasound waves to generate a plurality of foci of ultrasound at the inner surface of the cortical bone, each of which may constructively interfere with each other to generate coherent ultrasound wave to propagate through the bone to the marrow tissue within. Similarly, the NRAM material may be configured to focus the reflected ultrasound waves. In particular, a point or planar ultrasound transducer may generate a pulse that propagates through the NRAM material, skin, muscle, bone, etc. and to the tissue beyond, and then may detect the returning ultrasound signal from that tissue through these interceding layers as if the bone is transparent to it. The current subject matter system may be further configured to quantify the tissue's acoustic properties beyond the cortical bone, and particularly, the relative attenuation and backscatter coefficients, to generate one or more planar images.

Figure 4:
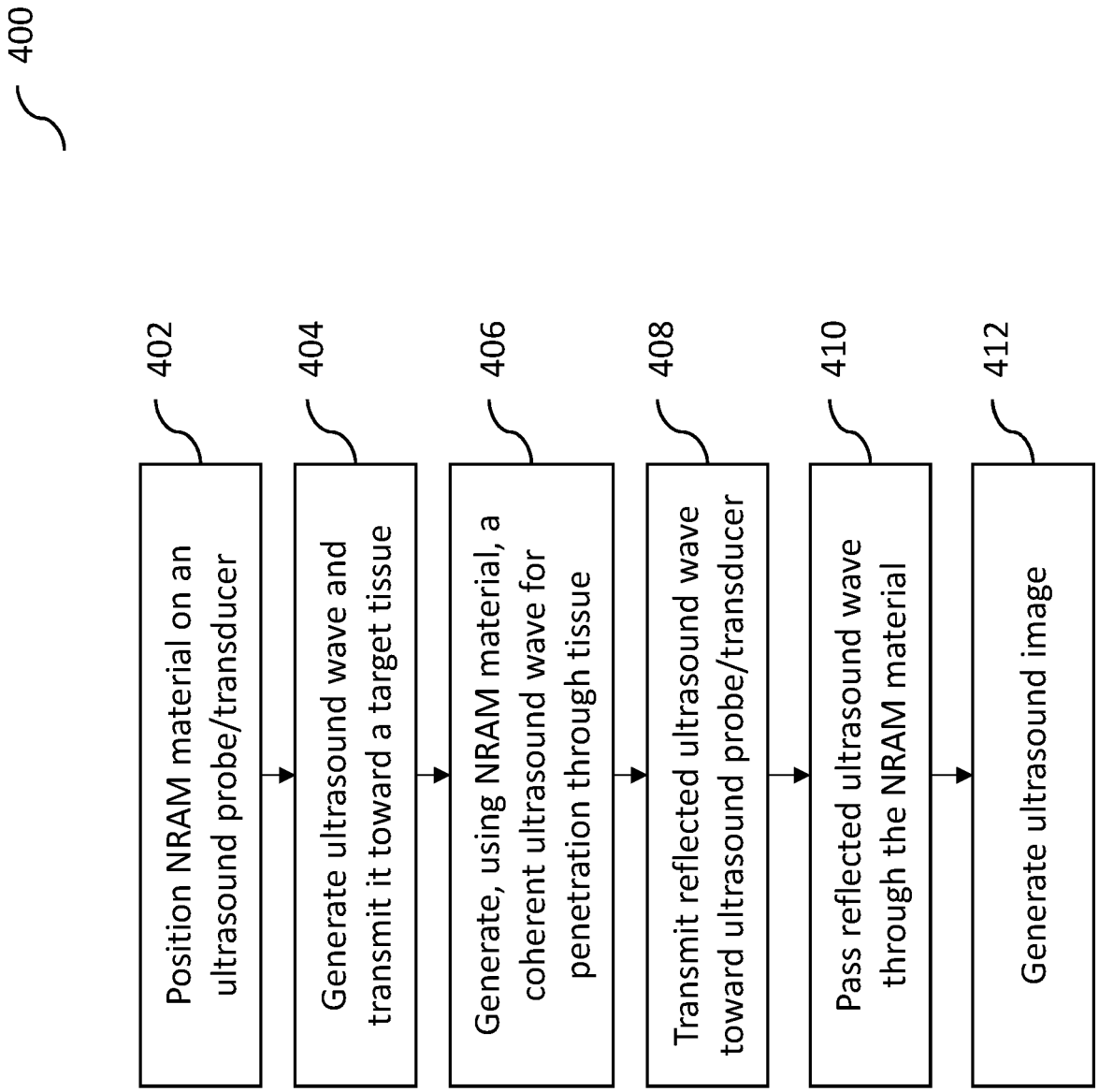
FIG. 4 illustrates an exemplary process for imaging a tissue using an non-resonant acoustic metamaterial, according to some implementations of the current subject matter.

FIG. 4 illustrates an exemplary process 400 for imaging a tissue using an non-resonant acoustic metamaterial, according to some implementations of the current subject matter. At 402, the NRAM material may be positioned on an ultrasound probe or transducer. The NRAM material may be positioned anywhere in the path of the ultrasound wave. Moreover, one or more NRAM materials (formed in accordance with the process described above) having any desired thickness, width, shape, shape of cavities, number of cavities, etc. may be used together with the ultrasound probe/transducer. The NRAM materials may be positioned at any location along the path of the ultrasound wave. The NRAM materials may be permanently positioned and/or temporarily positioned along the path of the ultrasound wave (transmitting and/or receiving).

At 404, an ultrasound wave is generated by the ultrasound probe/transducer and transmitted toward a target tissue (e.g., marrow tissue beyond cortical bone). The ultrasound wave may be initially transmitted through the NRAM material, which may be configured to generate a coherent ultrasound wave for penetration through the skin, soft tissue, and cortical bone to reach the target tissue, at 406.

At 408, the ultrasound wave may be reflected and transmitted toward the receiver in the ultrasound probe/transducer. The reflected wave may be again passed through the NRAM material, at 410, which may shift at least of one of a phase and an amplitude of the wave to generate a coherent beam.

At 412, an image may be generated by the ultrasound probe/transducer, upon receiving the reflected coherent beam. In some implementations, the NRAM material's sensitivity to variations in bone, tissue, etc. may be weak, thereby allowing a combination of the NRAM material and the ultrasound probe to be independent of the various factors that are routinely associated with conventional ultrasound probes.

In some exemplary implementations, referring back to FIGS. 1a-e and 2a-c, the NRAM material may include a periodic arrangement of thin rectangular (or any other shape) fluid cavities, e.g., cuboids. Each cuboid may be defined above and below by 50 nm of the stiff material 106 (e.g., SiN, SiO$_2$, and/or multilayer graphene), with spacers formed from 250 nm wide walls of soft photosensitive polymer such as acrylic (PMMA), epoxy (SU-8), silicon, polymer, and/or any other materials that may be patterned below 1 μm resolution. The individual cuboids may have lateral vents 122 (as, for example, shown in FIG. 2c). The size, shape, anisotropy, etc. of the cavities may create anisotropic effective mass density and/or compressibility, sufficiently anisotropic such that these values may become negative along the ultrasound wave propagation direction through the thickness of the material. These effective negative acoustic properties of the metamaterial may compensate for the stiffness of the cortical bone, thereby allowing efficient transmission of ultrasound waves. An effective stiffness, the compressibility b$_e$, of the NRAM material may be determined using $$b_e = b_o[0 - S(2Ad\rho L_e f)]$$

where b$_o$ and ρ are the compressibility and density of the gas, the cross-sectional area for the vent is S, and the lateral area of the cuboid is A, d is the side length of the cuboid, L$_e$ is the total height of the metamaterial, and f is the frequency of the ultrasound.

The effective density of the material may be made strongly anisotropic by the relative width of the walls to cavities, to the extent that a negative density may be obtained along the ultrasound propagation direction.

Figure 5:
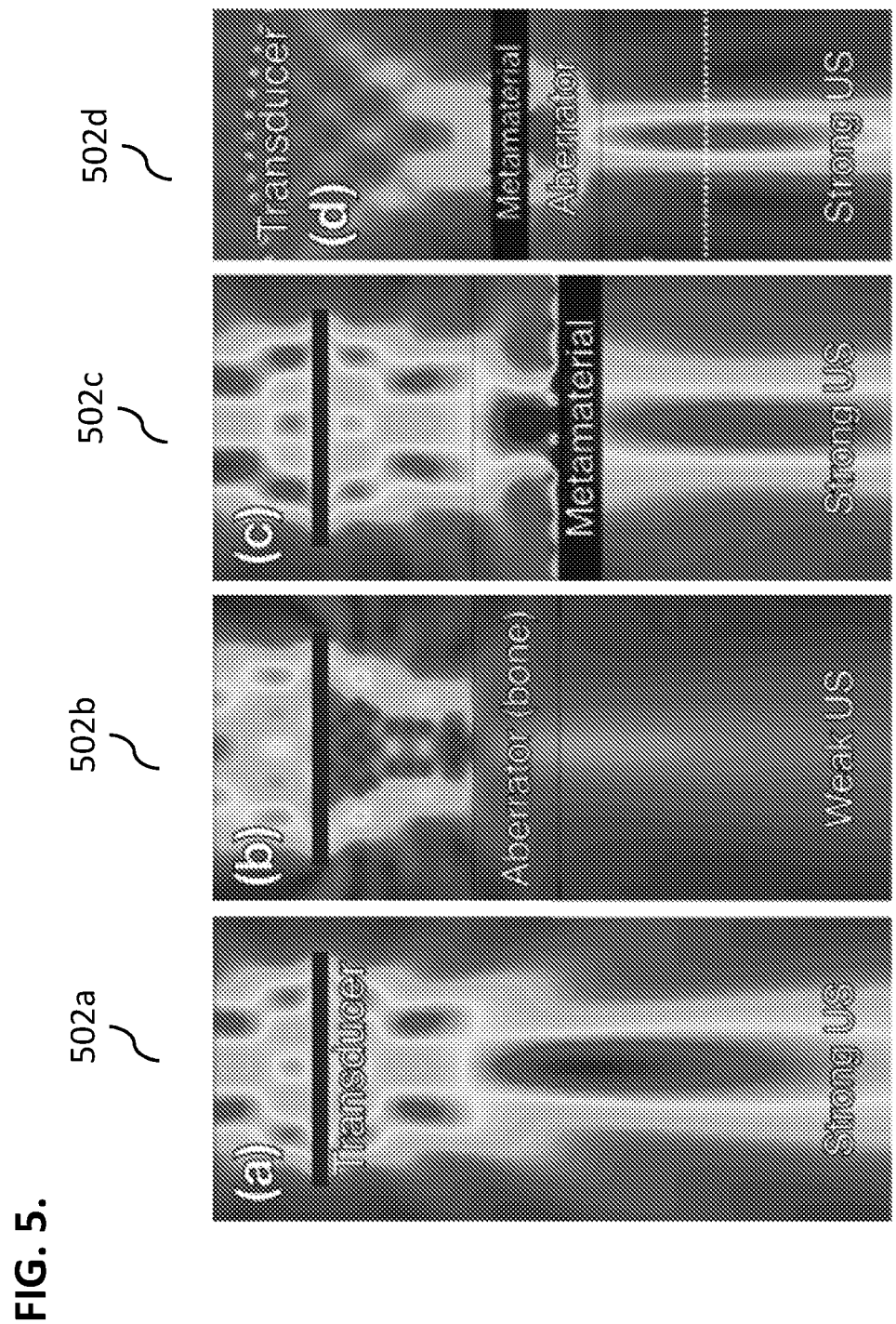
FIG. 5 illustrates exemplary images generated by an ultrasound equipment with and without use of the NRAM material formed using process shown in FIGS. 1a-e.

In some implementations, the configuration of the NRAM material shown in FIGS. 1a-2c may have a negative stiffness and density for ultrasound waves up having frequencies in a range of up at least 20 MHz. In some exemplary implementations, an operating frequency in a range of up to 250 MHz may be used to compensate for the stiff cortical bone that may be present along the ultrasound propagation path FIG. 5 illustrates images 502a-d generated by an ultrasound equipment with and without use of the NRAM material. In particular, image 502a illustrates an ultrasound wave (US) being transmitted by an ultrasound transducer ("Transducer" shown by a black solid line in all images) into the tissue without presence of an abberator (e.g., a cortical bone). The ultrasound wave transmission is unobstructed, i.e., strong, and a generated image is clear. However, once an abberator (e.g., a cortical bone) is introduced into the image path, the ultrasound wave is blocked and hence, fails to generate an image, as shown by the image 502b.

Image 502c illustrates use of current subject matter's NRAM material ("Metamaterial") with no abberator (i.e., cortical bone) present in the path of the ultrasound wave. Similar to image 502a, the generated image is clear. Hence, presence of the NRAM material does not affect image generation when there is no abberator. Image 502d illustrates use of the NRAM material when abberator (i.e., cortical bone) is present in the path of the transmitted ultrasound wave. Contrary to the image 502b, the NRAM material may allow the ultrasound wave to pass through the abberator to generate a clear ultrasound image. The NRAM material may operate without resonance, unlike traditional forms of acoustic metamaterials, to reduce their sensitivity to small changes in frequency, long range ordering, adjacent material properties, and/or morphology, which is important for various clinical uses.

In some implementations, the NRAM material may incorporate suspended silicon nitride (or any other materials, e.g., a graphene, a diamond, a metal nitride, a metal carbide, a silicon carbide, a metal oxide, a metal oxide bilayer, a silicon oxide bilayer, metal nitride bilayer, silicon nitride bilayer, aluminum nitride, aluminum carbide, aluminum oxide, aluminum oxide bilayer, aluminum nitride bilayer, chromium nitride, chromium carbide, chromium oxide, chromium oxide bilayer, chromium nitride bilayer, etc.; any other metals and/or materials may be used) membranes supported on microstructure pillars using multi-stack processing and thin film transfer to create cavities (or cuboids) having a size in a range of approximately 200 nm to approximately 20 μm that may be used for anisotropic sound propagation. High-resolution electron beam lithography and/or any other methods may be used to create cavity having the above dimensions. As stated above, the cavities may be created using tough, stiff, and atomically thin graphene. The nanoscale NRAM material may be configured to operate with ultrasound waves having higher operating frequencies (as compared to the conventional materials).

In some implementations, to fabricate a device having the NRAM material for use with an ultrasound transducer/probe, one or more individual cuboid cells may be created. A finite element analysis (FEA, ANSYS) of individual cuboid unit cells may be conducted to determine a net density and stiffness of the NRAM material using an extensive symmetry in the structure. The individual unit cell model of the NRAM material structure may be used to determine an effect of geometry and/or material choices on the NRAM material and acoustic wave propagation through it.

The NRAM's characteristics determined from one unit cell model may then be applied to the following, two-dimensional solid media in-silico representation of the entire multicellular material, together with a viscoelastic layer of tissue, an elastic layer of cortical bone, and a viscoelastic layer of bone marrow. This model may be used to identify an ability of the material to transmit coherent ultrasound in time-domain FEA analyses, applied as a displacement boundary condition at the NRAM's outer surface, to the opposite side of the model, the surface of the bone marrow. By applying either a perfectly reflecting and/or perfectly absorbing boundary condition at the bone marrow surface, it may be possible to determine an ability of the material to aid in transmission and/or detection of ultrasound through the system. The current subject matter system may be configured to compute both A-scan (amplitude versus time) and/or C-scan (spatial imagery) representations that may be used to assess the NRAM material for the purposes of increasing a return signal intensity and/or coherence from the bone marrow and reducing them from the tissue-cortical bone interface. This model may also be used for determination of the sensitivity of the NRAM to the thicknesses and material properties of the tissue, bone, and marrow, and/or the misalignment of the layers with respect to each other.

As discussed above, the NRAM material may be fabricated in a stacked form that may be, in some exemplary implementations, be approximately 1 mm thick, which may be used for ultrasound wave to penetrate into the bone marrow. The exemplary fabrication process may be performed by nanostructuring 1-10 μm thick multilayer films and thin film transferring and stacking of these multilayer films to form the final 0.1 to 1 mm thick NRAM material. A stack of alternating thin films of silicon nitride (SiN) and of acrylic (e.g., PMMA) may be initially created, as discussed above. SiN is a hard, transparent and a stable material with a Young's modulus (E) of 350 GPa, while PMMA is relatively soft (E~2 GPa) but patternable via electron-beam radiation and thus, may be used for nanostructuring to form the NRAM cuboids within the 1-10 μm thick multilayer structure. The e-beam radiation may expose selected regions of the PMMA within the intercalated SiN-PMMA stack. The exposed PMMA may be then removed via one or more vent ports positioned in the same plane as the cuboid structures. These same vent ports may be used to provide negative density for ultrasound passing across the NRAM material, and the cuboid structure may provide a desired negative stiffness. Since layers 0.1 to 1 mm in thickness may be needed to compensate for the cortical bone layer, 100-1000 (or any other number) of these multilayer films may be stacked using a combinatorial process and a final bond of the layers may be performed to form the NRAM material. Next, an alignment may be performed to transfer and stack the modules. In some exemplary implementations, if necessary, the layers may be further aligned and/or sealed, however, because the one or more NRAM material size features are smaller than the wavelength of the ultrasound, the NRAM material and its corresponding functionalities may be able to perform its intended functionalities even if layers are misaligned.

In some implementations, the NRAM material may be used to make up to approximately 0.4 mm (or any other thickness) of cortical bone transparent to ultrasound at frequencies of approximately 250 MHz (or any other frequency discussed above), including the interceding soft tissue, enabling assessment of the state of bone marrow within, with useful experimental and analysis data describing the material characteristics and expected behavior in ultrasound phantoms.

In some implementations, to allow venting of each nanoscale cell, the NRAM material's cells may include a gradient in the vent size laterally across each layer of the NRAM material. Further, through-thickness venting and/or lateral isolation of groups of unit cuboid cells with gaps between them may be used for venting purposes.

In some implementations, a quantitative ultrasound (QUS) methods for both NRAM performance and bone marrow characterization may be used to provide frequency-dependent attenuation (AC) and backscatter coefficients (BSC) for the useful bandwidth of ultrasound transducers for ex vivo and/or in vivo application. AC and BSC are frequency-dependent fundamental properties of tissue, reflecting tissue's composition and structure. QUS may acquire a raw beam-formed radio frequency ultrasound (RF) echo data, correct for machine-and/or transducer-dependent factors, and/or correct for overall attenuation (it may be used for a variety of ex- and in vivo pre-clinical and/or clinical applications).

Figure 6:
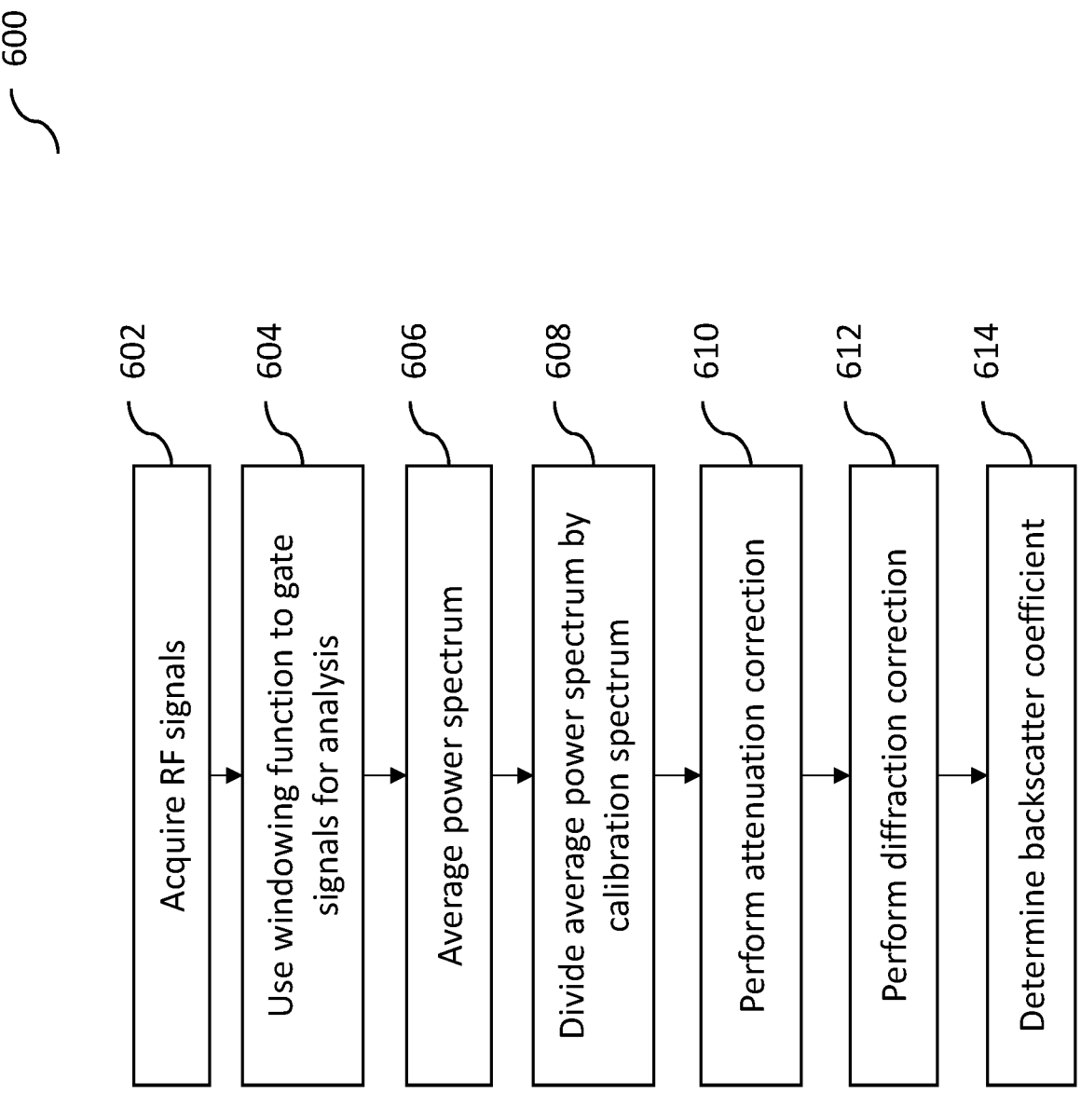
FIG. 6 illustrates an exemplary process for executing a quantitative ultrasound procedure using an ultrasound transducer together with the NRAM material, according to some implementations of the current subject matter.
Figure 7A:
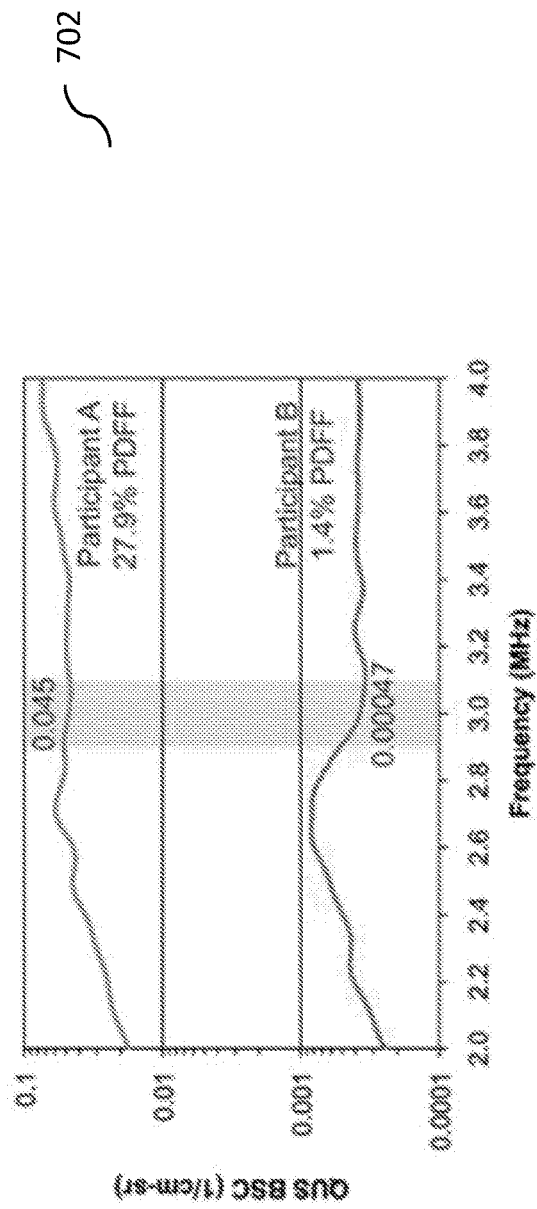
FIGS. 7a-b illustrate exemplary parametric maps of diffraction coefficients, according to some implementations of the current subject matter.
Figure 7B:
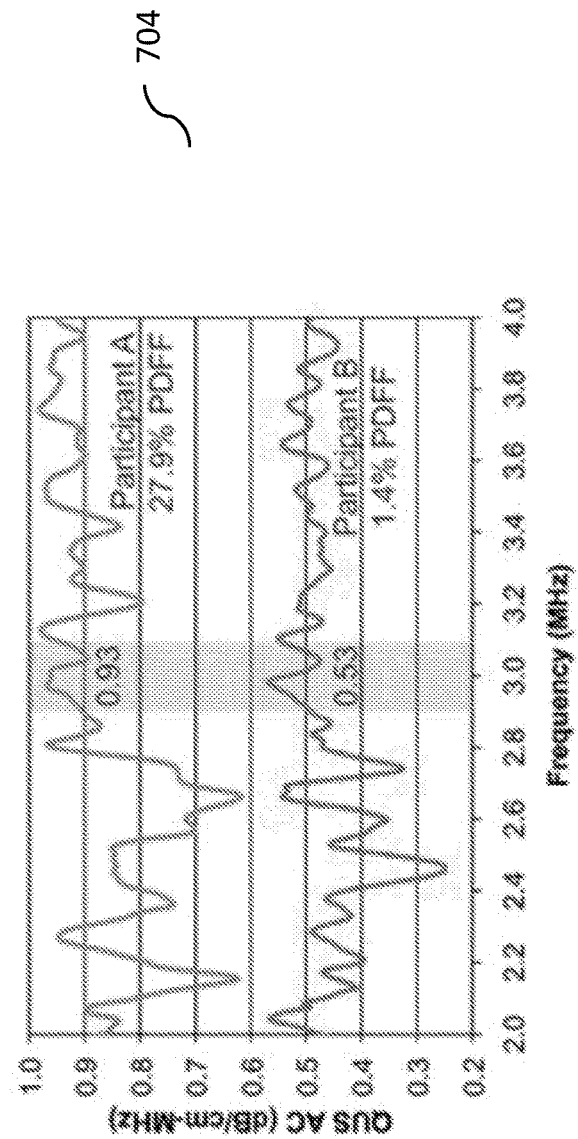

FIG. 6 illustrates an exemplary process 600 for executing a quantitative ultrasound procedure using an ultrasound transducer together with the NRAM material, according to some implementations of the current subject matter. The process 600 may be applied to single-element transducers, arrays and/or plane-wave imaging methods to generate BSC and/or AC spectra using a reference phantom technique with standard clinical arrays to estimate a fat fraction. At 602, radio frequency ultrasound (RF) echo data may be acquired using the ultrasound transducer with the NRAM material/device coupled to it. At 604, a windowing gate function may be used to perform analysis of gate signals of the acquired data. This analysis may be performed by the processing circuitry of the ultrasound machine (that may include transducer, processors, memory, etc.). At 606, power spectrum may be determined and averaged. The average power spectrum may be divided by a calibration spectrum value(s), at 608, At 610, attenuation correction may be executed, which may be followed by diffraction correction, at 612. Thereafter, diffraction coefficients (AC and/or BSC) may be determined, at 614. The process 600 may be used to generate one or more parametric maps of BSC coefficient 702 (as shown in FIG. 7a) and AC coefficient 704 (as shown in FIG. 7b) that may be overlaid on the B-mode images, where the maps illustrate variations in coefficients for patients having differing proton density fat fraction (PDFF) (e.g., participant A may have a PDFF of 27.9%, AC=0.93 dB/cm/MHz, BSC=0.045/cm-sr; participant B may have a PDFF of 1.4%, AC=0.53 dB/cm/MHz, BSC=0.00047/cm-sr). Using an ultrasound transducer and the NRAM materials, ultrasound waves may be transmitted through cortical bone to the trabecular bone and marrow within, to identify presence of BML using B-mode and QUS (whereby MRI may be used to provide location and/or extent for comparison).

Figure 8:
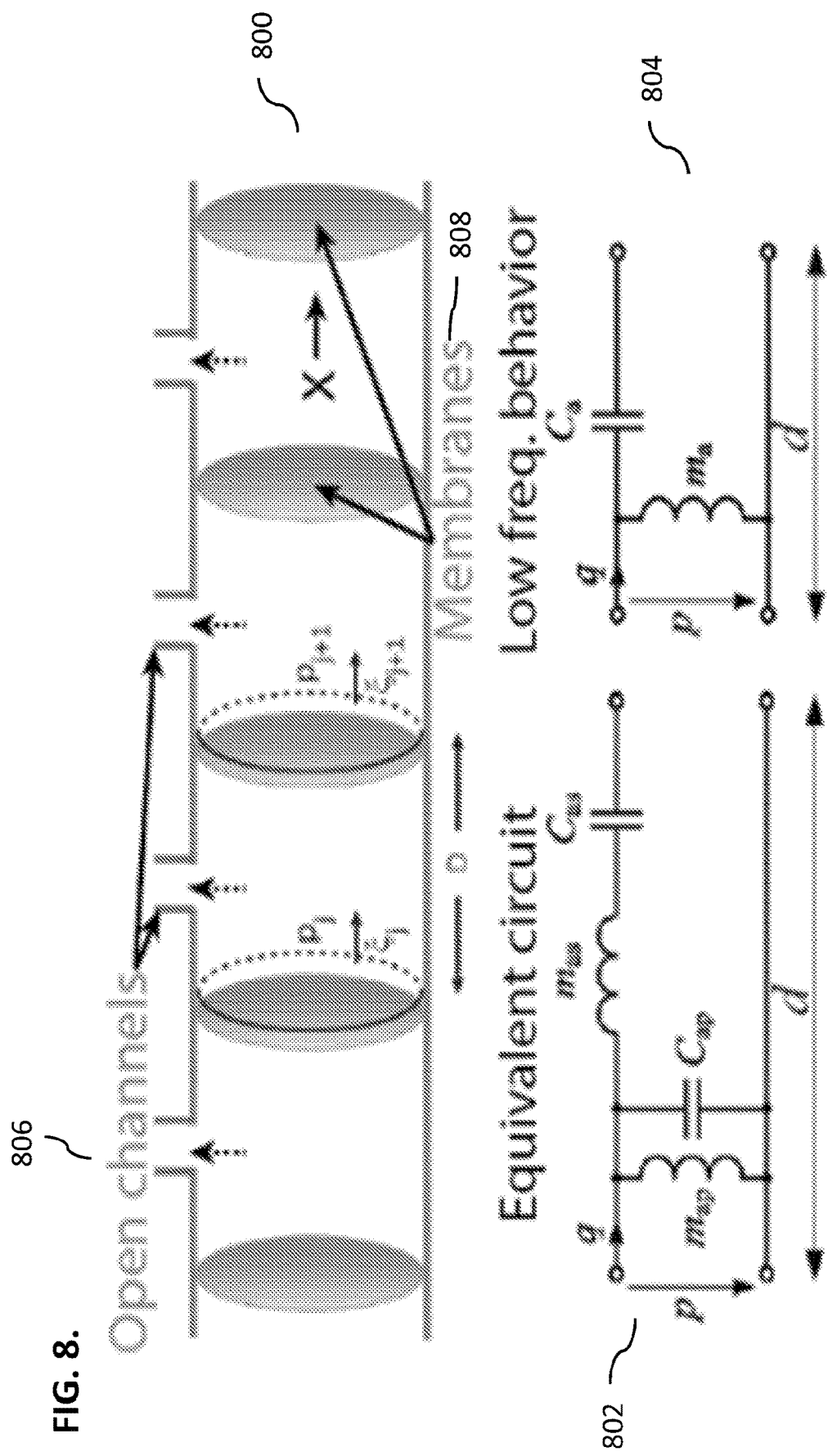
FIG. 8 illustrates an exemplary architecture of the NRAM material having membranes (SiN) and open channels along with the equivalent circuit and a low frequency behavior circuit, according to some implementations of the current subject matter.

In some implementations, the current subject matter's NRAM material may be configured to avoid narrow band operation and/or high losses that may be typically associated with resonant metamaterials. NRAM material may be configured to have a frequency window $\Delta f/f_o$ of approximately 5-10% to tune modulus and density, which may be advantageous in view of skull variations in thickness and/or composition. As described above, the NRAM material may be include one or more acoustic wave-guiding cavities having the following components: membranes 808 producing negative density and open channels 806 giving negative modulus. FIG. 8 illustrates an exemplary architecture 800 of the NRAM material having membranes (SiN) 808 and open channels 806 along with the equivalent circuit 802 and a low frequency behavior circuit 804. At low frequency, below resonance, the dominant elements may be an acoustic compliance of the membranes 808 $C_a$ (series capacitors in the circuit), and the acoustic mass of the open channels 806 $m_a$ (shunt inductors). The equations relating acoustic compliance and masses with effective density and modulus may be expressed as follows:

$$\rho_{eq} = \frac{Z_{as}}{i\omega}\frac{S}{d} = \frac{1}{i\omega}\frac{S}{d}\left(i\omega m_{as} + \frac{1}{i\omega C_{as}}\right);$$

-continued $$K_{eq}^{-1} = \frac{Y_{ap}}{i\omega}\frac{1}{Sd} = \frac{1}{i\omega}\frac{1}{Sd}\left(i\omega C_{ap} + \frac{1}{i\omega m_{ap}}\right)$$

From the above equations, NRAM operating frequencies and sizes of unit cells may be determined (e.g., operating frequencies of 1-250 MHz may require 100-10 μm unit cells. By way of a non-limiting example, the NRAM material may be configured to have an operating frequency of 5.5 MHz, having density $\rho^{[M]}$ approximately −4000 kg/m³, $K^{[M]}$ approximately −10 GPa, channel diameter of approximately 20 μm, cavity length of approximately 20 μm, $SiN_x$ membrane being approximately 750 nm thick, and an open channel (channel 122 as shown in FIG. 2c) being approximately 5 μm wide. As can be understood, other values may be used.

Figure 9A:
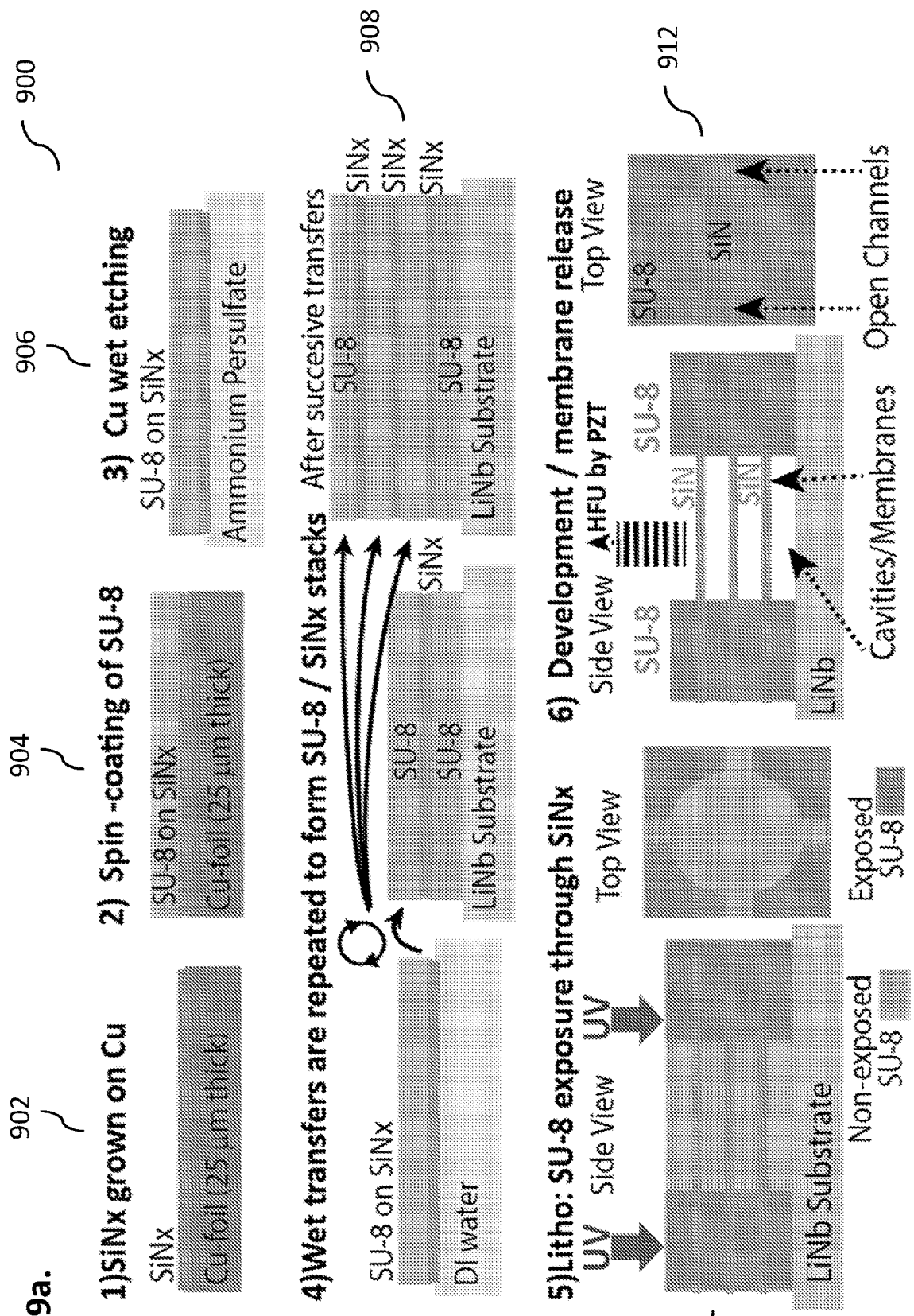
FIGS. 9a-9b illustrate exemplary methods for fabricating the NRAM material, according to some implementations of the current subject matter.
Figure 9B:
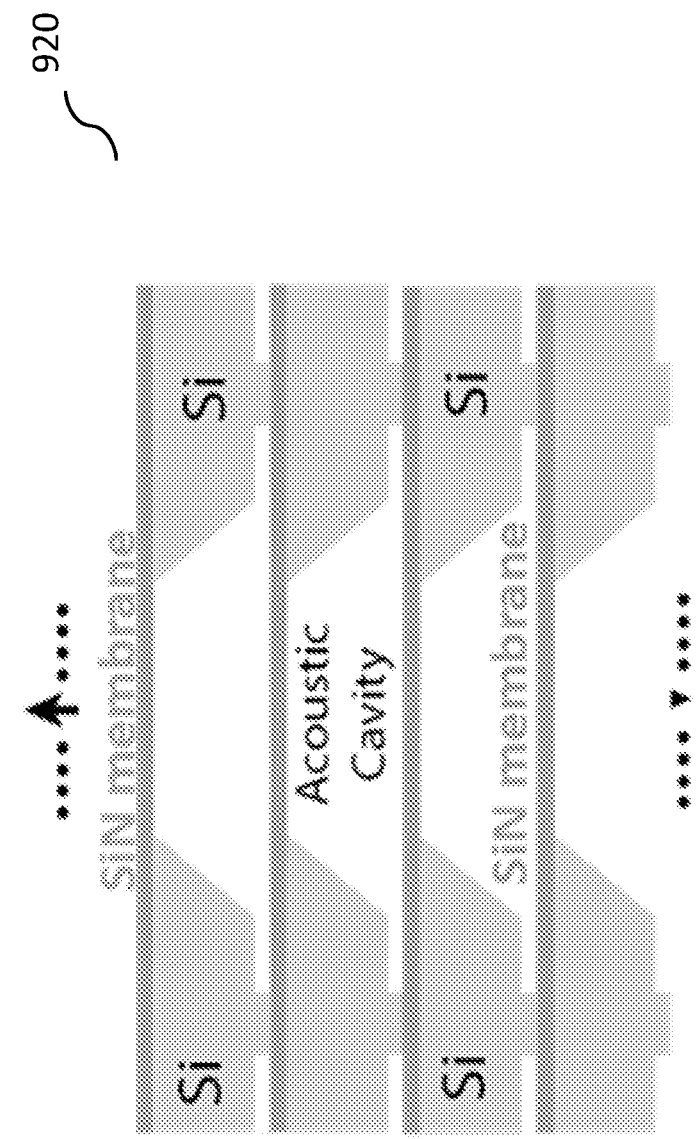

FIGS. 9a-9b illustrate exemplary methods 900 and 920 for fabricating the NRAM material, according to some implementations of the current subject matter. The processes are similar to those described above in connection with FIGS. 1a-2c. In particular, FIG. 9a illustrates a process 900 for fabricating NRAM material by stacking of SiNx and SU-8 layers, whereby the fabricated NRAM material may be capable of having an operating frequency of 1-250 MHz. FIG. 9b illustrates a process 920 for fabricating NRAM material by stacking of SiNx and Si layers, whereby the fabricated NRAM material may be capable of having an operating frequency of 1-5 MHz. The processes 900, 920 may be configured to produce NRAM materials having cavity sizes of less than 100 μm. A silicon clean room technology (UV approximately 1 μm) may be used to fabricate SiNx membranes. In some exemplary implementations, SiNx may be configured to have a modulus E>170 GPa, a tunable tensile stress and high fracture toughness (KIC), as well as high chemical stability. By way of a non-limiting example, a 10 μm wide SiNx membrane may be capable of resonating at an operating frequency of >250 MHz.

Referring to FIG. 9a, the process 900 may be initiated by growing SiNx layer on a substrate (e.g., Cu foil substrate having a thickness of 25 μm (or any other material/thickness)), at 902. SU-8 material (or any other material, e.g., silicon, polymer, etc.) may be spin-coated on the SiNx layer-substrate combination, at 904. A portion of the substrate or an entire substrate may be removed, such as by performing a wet etching and/or any other methods, at 906. Then, one or more stacks of SiNx-SU-8 layers may be fabricated and wet-transferred on a substrate (e.g., LiNb substrate and/or any other substrate), at 908. After such repeated transfers, multiple stacked layers of SiNx-SU-8 layers may be produced. During a lithographic stage, at 910, SU-8 material may be exposed to UV radiation for the purposes of removing it at the next stage. At a development/membrane release stage, at 912, the SU-8 material may be removed to form cavities/membranes and open channels.

An alternative process 920, as shown in FIG. 9b, illustrates use of the Si materials together with the SiNx materials to form an NRAM material. As part of the process 920, individual chips with etched channels and SiNx membranes may be fabricated. Then, the layers may be stacked and clamped using one or more micro-precision screws, as shown in FIG. 9b. In an exemplary, non-limiting implementations, 50 μm thick chips may be capable of having an operating frequency of 1-5 MHz.

Figure 10:
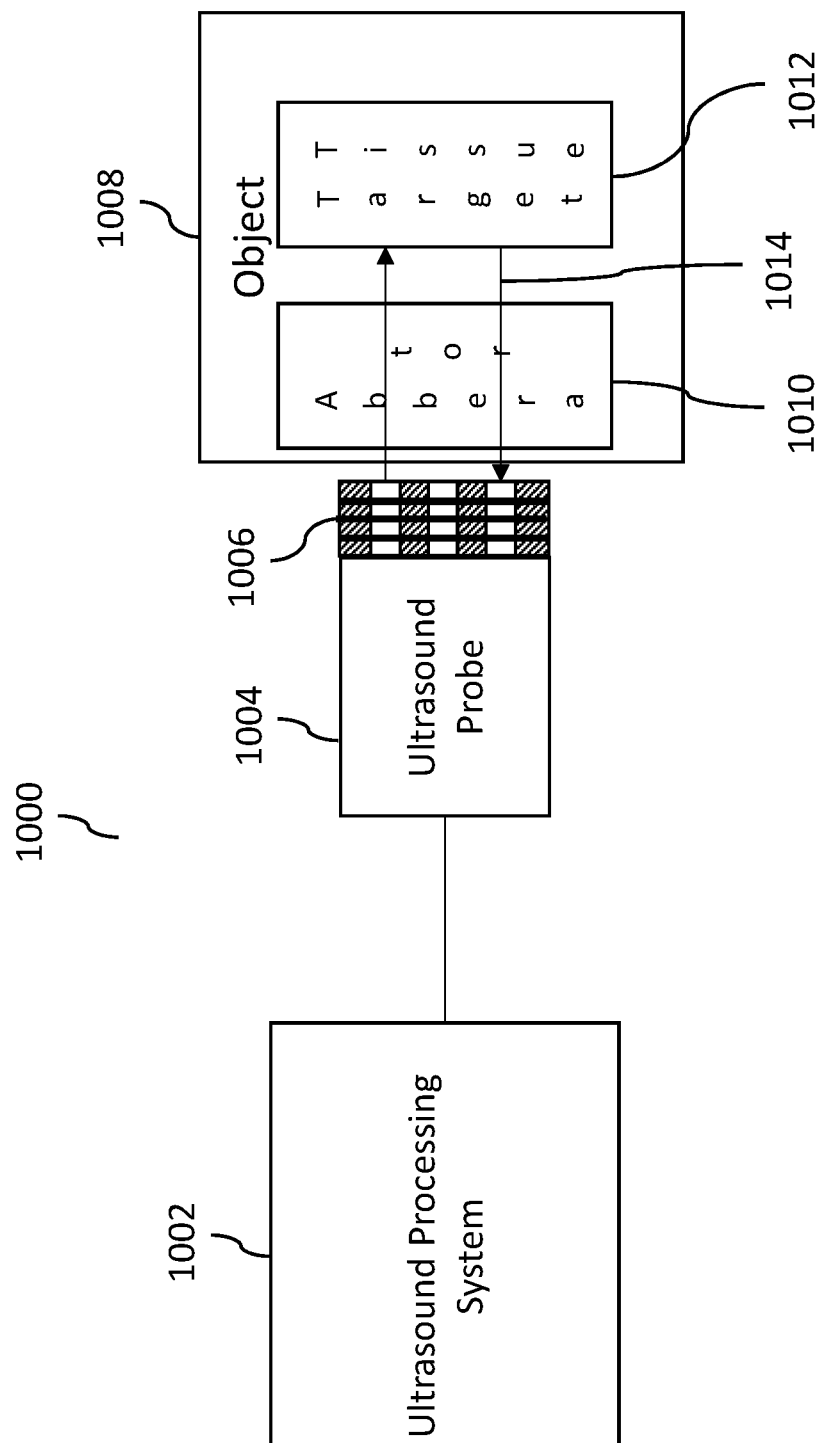
FIG. 10 illustrates an exemplary ultrasound system that implements the NRAM material described above in connection with FIGS. 1a-9a, according to some implementations of the current subject matter.

FIG. 10 illustrates an exemplary ultrasound system 1000 that implements the NRAM material described above in connection with FIGS. 1a-9a, according to some implementations of the current subject matter. The system 1000 may include an ultrasound processing system 1002, an ultrasound probe and/or transducer 1004, and the NRAM material or device 1006. In some implementations, the processing system 1002 and the probe/transducer 1004 may be a single unit. The NRAM material or device 1006 may be configured to be coupled to the probe/transducer 1004. The coupling may be optical, mechanical, electro-mechanical, optico-mechanical, optico-electro-mechanical, and/or any other type of coupling.

In some implementations, the NRAM material 1006 may be configured to be placed directly on the skin of the object 1008 (e.g., via an ultrasound gel). The probe/transducer 1004 may be configured to generate one or more ultrasound waves 1014 that may be configured to pass through the NRAM material 1006 and toward a target tissue 1012, where the target tissue (e.g., marrow) 1012 may be located "behind" an abberator tissue 1010 (e.g., cortical bone). The NRAM material 1006 may be configured to shift phase and/or amplitude of the ultrasound waves 1014 passing through it to penetrate the abberator tissue 1010 to reach the target tissue 1012 and be reflected back to through the abberator tissue 1012, where the NRAM material may also focus and/or shift phase and/or amplitude of the reflected waves toward the receiver in the probe/transducer for processing by the system 1002.

Figure 11:
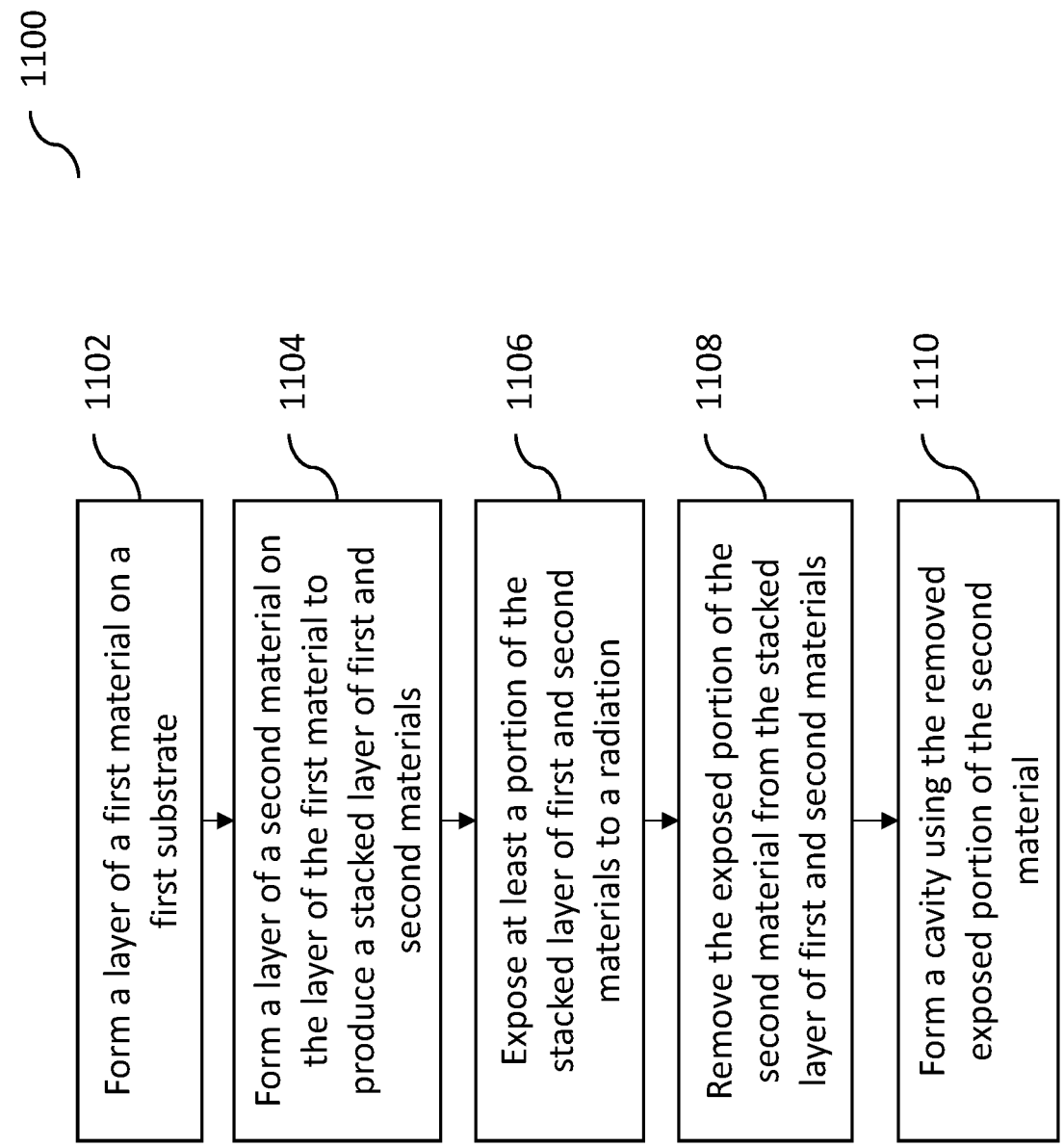
FIG. 11 illustrates an exemplary method, according to some implementations of the current subject matter.

FIG. 11 illustrates an exemplary method for fabricating a non-resonant acoustic metamaterial (e.g., similar to the one shown in FIGS. 1a-10), according to some implementations of the current subject matter. At 1102, a layer of a first material may be formed on a first substrate. At 1104, a layer of a second material may be formed on the layer of the first material to produce a stacked layer of first and second materials. At 1106, at least a portion of the stacked layer of first and second materials may be exposed to a radiation. At 1108, the exposed portion of the second material may be removed from the stacked layer of first and second materials. At 1110, a cavity may be formed using the removed exposed portion of the second material. The cavity may include a membrane formed from at least a portion of the first material.

In some implementations, the current subject matter may include one or more of the following optional features. The method may include removing at least a portion of the first substrate subsequent to the forming of the layer of a second material on the layer of the first material. The method may also include transferring the stacked layer of the first and second materials onto a second substrate.

In some implementations, the stacked layer of the first and second materials may include a plurality of alternating layers of the first material and the second material. In some implementations, the removing may further include removing a plurality of layers of the second materials from the stacked layer of the first and second materials while retaining a plurality of first materials. The cavity may include a plurality of portions of layers of the first material forming a plurality of membranes. Further, the plurality of membranes may be configured to resonate at a predetermined operating frequency and configured to shift phase and/or amplitude of one or more ultrasound waves passing through the cavity. The predetermined operating frequency may be in a range of approximately 100 KHz to approximately 250 MHz.

In some implementations, the first material may be a hard material and the second material is a soft material. The first material may include at least one of the following: a silicon oxide, a silicon nitride, a graphene, a diamond, a metal nitride, a metal carbide, a silicon carbide, a metal oxide, a metal oxide bilayer, a silicon oxide bilayer, metal nitride bilayer, silicon nitride bilayer, aluminum nitride, aluminum carbide, aluminum oxide, aluminum oxide bilayer, aluminum nitride bilayer, chromium nitride, chromium carbide, chromium oxide, chromium oxide bilayer, chromium nitride bilayer, and any combinations thereof. Any other metals and/or materials may be used. The second material may include at least one of the following: a polymethyl methacrylate (PMMA) material, SU-8 material, silicon, polymer, and any combinations thereof.

In some implementations, the cavity may be filled with at least one of the following: a fluid, a gas, and any combinations thereof.

In some implementations, the cavity may be configured to be connected to at least another cavity formed in at least another second layer and further configured to be separated from at least another cavity by at least one of: the membrane and at least another membrane.

In some implementations, the current subject matter relates to a non-resonant acoustic metamaterial apparatus that may be formed in accordance with the discussion above (e.g., method 1100 shown in FIG. 11). The apparatus may include a layer of a first material on a first substrate, a layer of a second material formed on the layer of the first material to produce a stacked layer of first and second materials and a cavity. The cavity may be formed by exposing at least a portion of the stacked layer of first and second materials to a radiation, removing the exposed portion of the second material from the stacked layer of first and second materials, and forming the cavity using the removed exposed portion of the second material, wherein the cavity includes a membrane formed from at least a portion of the first material. The apparatus may include some of the optional features discussed above.

In some implementations, the current subject matter relates to an ultrasound system that may include an ultrasound transducer and the non-resonant acoustic metamaterial coupled to the ultrasound transducer having features discussed above.

Without in any way limiting the scope, interpretation, or application of the claims appearing below, a technical effect of one or more of the example embodiments disclosed herein may provide an ability to allow imaging of objects, tissues, materials, etc. using ultrasound waves, where the objects may be located behind an interfering body (e.g., in case of a bone marrow, a cortical bone, etc.). This advantage may be achieved through controllable scattering of ultrasound waves prior to passage through interfering objects to compensate for the presence of the such objects along the ultrasound wave propagation path, thereby producing a coherent, focused ultrasound beam after passage through the objects for characterization, imaging, etc. of objects beyond it.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A non-resonant acoustic metamaterial apparatus configured to compensate for aberrations in ultrasound caused at least in part by transitions between cortical bone and soft tissue, the non-resonant acoustic metamaterial apparatus comprising:
   a first layer of a first material formed on a first substrate;
   a second layer of a second material formed on the first layer of the first material, wherein the first layer and the second layer form a first structure comprising a first cavity;
   a third layer of the first material formed on the second layer of the second material;
   a fourth layer of the second material formed on the third layer, wherein the third layer and the fourth layer form a second structure comprising a second cavity,
   wherein the first cavity comprises at least a bottom wall comprised of the first material,
   wherein the bottom wall provides a membrane that separates in a vertical plane the first cavity from the second cavity,
   wherein the membrane is configured to resonate at a predetermined operating frequency and configured to shift a phase and/or an amplitude of the ultrasound to compensate at least in part for the aberrations in the ultrasound caused by the transitions between the cortical bone and the soft tissue, and
   wherein the first cavity and the second cavity are formed by at least:
      exposing at least a portion of a plurality of layers comprising the first layer, the second layer, the third layer, and the fourth layer to a radiation;
      removing the exposed portion of the second material from the plurality of layers; and
      wherein the first cavity and the second cavity are formed in the removed exposed portion of the second material.

2. The non-resonant acoustic metamaterial apparatus according to claim 1, further comprising one or more additional cavities disposed in the vertical plane of the first cavity and the second cavity, wherein the one or more additional cavities compensate at least in part for the aberrations in generating an ultrasound image.

3. The non-resonant acoustic metamaterial apparatus according to claim 1, further comprising one or more additional cavities disposed in a horizontal plane of the first cavity and the second cavity, wherein the one or more additional cavities disposed in the horizontal plane are separated by sidewalls formed of the second material.

4. The non-resonant acoustic metamaterial apparatus according to claim 1, wherein the predetermined operating frequency is in a range of approximately 100 KHz to approximately 250 MHz.

5. The non-resonant acoustic metamaterial apparatus according to claim 1, wherein the first material is a hard material and the second material is a soft material.

6. The non-resonant acoustic metamaterial apparatus according to claim 1, wherein the first material includes at least one of a silicon oxide, a silicon nitride, a graphene, a diamond, a metal nitride, a metal carbide, a silicon carbide, a metal oxide, a metal oxide bilayer, a silicon oxide bilayer, metal nitride bilayer, silicon nitride bilayer, aluminum nitride, aluminum carbide, aluminum oxide, aluminum oxide bilayer, aluminum nitride bilayer, chromium nitride, chromium carbide, chromium oxide, chromium oxide bilayer, chromium nitride bilayer, or any combinations thereof;
   wherein the second material includes at least one of a polymethyl methacrylate (PMMA) material, SU-8 material, silicon, polymer, or any combinations thereof.

7. The non-resonant acoustic metamaterial apparatus according to claim 1, wherein the cavity is filled with at least one of a fluid, a gas, or any combinations thereof.

8. The non-resonant acoustic metamaterial apparatus according to claim 1, wherein the plurality of layers comprise between 100 and 1000 alternating layers comprising the first material and the second material to enable compensation of the aberrations.

9. An ultrasound system, comprising:
   an ultrasound transducer;
   a non-resonant acoustic metamaterial coupled to the ultrasound transducer, wherein the non-resonant acoustic metamaterial is configured to compensate for aberrations in ultrasound caused at least in part by transitions between cortical bone and soft tissue;

wherein the non-resonant acoustic metamaterial comprises
a first layer of a first material formed on a first substrate;
a second layer of a second material formed on the layer of the first material, wherein the first layer and the second layer form a first structure comprising a first cavity;
a third layer of the first material formed on the second layer of the second material;
a fourth layer of the second material formed on the third layer, wherein the third layer and the fourth layer form a second structure comprising a second cavity,
wherein the first cavity comprises at least a bottom wall comprised of the first material,
wherein the bottom wall provides a membrane that separates in a vertical plane the first cavity from the second cavity,
wherein the membrane is configured to compensate at least in part for the aberrations in the ultrasound caused by the transitions between the cortical bone and the soft tissue.

10. The ultrasound system according to claim 9, further comprising one or more additional cavities disposed in the vertical plane of the first cavity and the second cavity, wherein the one or more additional cavities compensate at least in part for the aberrations in generating an ultrasound image.

11. The ultrasound system according to claim 10, further comprising one or more additional cavities disposed in a horizontal plane of the first cavity and the second cavity, wherein the one or more additional cavities disposed in the horizontal plane are separated by sidewalls formed of the second material.

12. The ultrasound system according to claim 9, wherein the first material is a hard material and the second material is a soft material, and wherein the membrane is configured to resonate at a predetermined operating frequency and configured to shift a phase and/or an amplitude of the ultrasound.

13. The ultrasound system according to claim 9, wherein the first material includes at least one of a silicon oxide, a silicon nitride, a graphene, a diamond, a metal nitride, a metal carbide, a silicon carbide, a metal oxide, a metal oxide bilayer, a silicon oxide bilayer, metal nitride bilayer, silicon nitride bilayer, aluminum nitride, aluminum carbide, aluminum oxide, aluminum oxide bilayer, aluminum nitride bilayer, chromium nitride, chromium carbide, chromium oxide, chromium oxide bilayer, chromium nitride bilayer, or any combinations thereof;

wherein the second material includes at least one of a polymethyl methacrylate (PMMA) material, SU-8 material, silicon, polymer, or any combinations thereof.

14. The ultrasound system according to claim 9, wherein the cavity is filled with at least one of a fluid, a gas, and or combinations thereof.

15. The ultrasound system according to claim 9, wherein the cavity is configured to be connected to at least another cavity formed in at least another second layer and further configured to be separated from the at least another cavity by at least one of: the membrane and at least another membrane.

* * * * *